US010132611B2

(12) United States Patent
Steffey et al.

(10) Patent No.: US 10,132,611 B2
(45) Date of Patent: Nov. 20, 2018

(54) LASER SCANNER

(71) Applicant: FARO Technologies, Inc., Lake Mary, FL (US)

(72) Inventors: Kenneth Steffey, Longwood, FL (US); Reinhard Becker, Ludwigsburg (DE); Bernd-Dietmar Becker, Ludwigsburg (DE); Jurgen Gittinger, Ludwigsburg (DE)

(73) Assignee: FARO TECHNOLOGIES, INC., Lake Mary, FL (US)

(*) Notice: Subject to any disclaimer, the term of this patent is extended or adjusted under 35 U.S.C. 154(b) by 83 days.

(21) Appl. No.: 15/017,816

(22) Filed: Feb. 8, 2016

(65) Prior Publication Data
US 2016/0169659 A1 Jun. 16, 2016

Related U.S. Application Data

(63) Continuation of application No. 14/026,243, filed on Sep. 13, 2013, now Pat. No. 9,279,662.
(Continued)

(51) Int. Cl.
G01B 11/00 (2006.01)
G01S 7/481 (2006.01)
(Continued)

(52) U.S. Cl.
CPC .......... G01B 11/002 (2013.01); G01S 7/4817 (2013.01); G01S 17/89 (2013.01); G02B 26/10 (2013.01); G02B 26/127 (2013.01)

(58) Field of Classification Search
CPC .............................. G01B 11/24; G01S 7/4817
See application file for complete search history.

(56) References Cited

U.S. PATENT DOCUMENTS 3,830,567 A 8/1974 Riegl
3,899,145 A 8/1975 Stephenson
(Continued)

FOREIGN PATENT DOCUMENTS

AU 2005200937 A1 9/2006
CN 101416024 A 4/2009
(Continued)

OTHER PUBLICATIONS

Chinese Office Action for Application No. 201380047602.6 dated May 23, 2016; 11 pages.
(Continued)

Primary Examiner — Dominic J Bologna
(74) Attorney, Agent, or Firm — Cantor Colburn LLP

(57) ABSTRACT

A method and system for acquiring three-dimensional (3D) coordinates of a surface is provided. The method includes providing the scanner configured to emit a light from the light source and reflect the light onto the surface, the scanner further being configured to determine with a processor a three-dimensional coordinate of a point on the surface based at least in part on a first and second angle measuring device and a reflection of the light from the surface. An image is acquired of the surface with a camera and a feature is identified. A first area is identified having a high information content and a first arc segment is determined. The surface is scanned by rotating a motor at a first speed during the first arc segment and at a second speed during a second arc segment, the second speed being greater than the first speed.

20 Claims, 14 Drawing Sheets

Related U.S. Application Data

(60) Provisional application No. 61/701,021, filed on Sep. 14, 2012.

(51) Int. Cl.
    *G01S 17/89*     (2006.01)
    *G02B 26/10*     (2006.01)
    *G02B 26/12*     (2006.01)

(56) References Cited

U.S. PATENT DOCUMENTS

| | | |
|---|---|---|
| 3,945,729 A | 3/1976 | Rosen |
| 5,181,234 A | 1/1993 | Smith |
| 5,218,427 A | 6/1993 | Koch |
| 5,313,261 A | 5/1994 | Leatham et al. |
| 5,329,347 A | 7/1994 | Wallace et al. |
| 5,329,467 A | 7/1994 | Nagamune et al. |
| 5,517,297 A | 5/1996 | Stenton |
| 5,933,267 A | 8/1999 | Ishizuka |
| 5,940,181 A | 8/1999 | Tsubono et al. |
| 5,988,862 A | 11/1999 | Kacyra et al. |
| 6,040,898 A | 3/2000 | Mrosik et al. |
| 6,069,700 A | 5/2000 | Rudnick et al. |
| 6,362,872 B1 | 3/2002 | Berdanier |
| 6,504,602 B1 | 1/2003 | Hinderling |
| 6,512,575 B1 | 1/2003 | Marchi |
| 6,512,993 B2 | 1/2003 | Kacyra et al. |
| 6,587,246 B1 | 7/2003 | Anderton et al. |
| 6,675,122 B1 | 1/2004 | Markendorf et al. |
| 6,710,859 B2 | 3/2004 | Shirai et al. |
| 6,852,975 B2 | 2/2005 | Riegl et al. |
| 6,856,381 B2 | 2/2005 | Christoph |
| 6,917,415 B2 | 7/2005 | Gogolla et al. |
| 7,076,420 B1 | 7/2006 | Snyder et al. |
| 7,127,822 B2 | 10/2006 | Kumagai et al. |
| 7,193,690 B2 | 3/2007 | Ossig et al. |
| 7,197,179 B2 | 3/2007 | Rubbert et al. |
| 7,285,793 B2 | 10/2007 | Husted |
| 7,430,068 B2 | 9/2008 | Becker et al. |
| 7,733,544 B2 | 6/2010 | Becker et al. |
| 7,847,922 B2 | 12/2010 | Gittinger et al. |
| 7,869,005 B2 | 1/2011 | Ossig et al. |
| 7,889,113 B2 | 2/2011 | Cardiasmenos et al. |
| 8,063,368 B1 | 11/2011 | Youngs et al. |
| 8,064,046 B2 | 11/2011 | Ossig et al. |
| 8,072,663 B2 | 12/2011 | O'Neill et al. |
| 8,368,875 B2 | 2/2013 | Kludas et al. |
| 8,478,480 B2 | 7/2013 | Mian et al. |
| 9,109,890 B2 | 8/2015 | Metzler |
| 9,664,508 B2 | 5/2017 | McAfee et al. |
| 2002/0059042 A1* | 5/2002 | Kacyra .................. G01B 11/002 702/152 |
| 2002/0143506 A1 | 10/2002 | D'Aligny et al. |
| 2002/0149694 A1 | 10/2002 | Seo |
| 2003/0043386 A1 | 3/2003 | Froehlich et al. |
| 2003/0137449 A1 | 7/2003 | Vashisth et al. |
| 2003/0179361 A1 | 9/2003 | Ohtomo et al. |
| 2004/0004727 A1 | 1/2004 | Yanagisawa et al. |
| 2004/0027554 A1 | 2/2004 | Ishinabe et al. |
| 2004/0119833 A1 | 6/2004 | Duncan et al. |
| 2004/0221790 A1 | 11/2004 | Sinclair et al. |
| 2004/0246462 A1 | 12/2004 | Kaneko et al. |
| 2005/0046823 A1 | 3/2005 | Ando et al. |
| 2005/0111514 A1 | 5/2005 | Matsumoto et al. |
| 2005/0141052 A1 | 6/2005 | Becker et al. |
| 2005/0190384 A1 | 9/2005 | Persi et al. |
| 2006/0022140 A1 | 2/2006 | Connelly et al. |
| 2006/0061566 A1 | 3/2006 | Verma et al. |
| 2006/0109536 A1 | 5/2006 | Mettenleiter et al. |
| 2006/0245717 A1 | 11/2006 | Kaltenbach et al. |
| 2007/0150111 A1 | 6/2007 | Wu et al. |
| 2007/0171394 A1 | 7/2007 | Steiner et al. |
| 2007/0229929 A1 | 10/2007 | Soreide et al. |
| 2007/0256311 A1 | 11/2007 | Ferrari |
| 2008/0112029 A1 | 5/2008 | Bodkin |
| 2008/0136626 A1 | 6/2008 | Hudson et al. |
| 2008/0235970 A1* | 10/2008 | Crampton .............. B25J 13/088 33/503 |
| 2008/0273758 A1 | 11/2008 | Fuchs et al. |
| 2008/0309546 A1 | 12/2008 | Wakayama et al. |
| 2008/0309665 A1 | 12/2008 | Gregory, II et al. |
| 2009/0133494 A1 | 5/2009 | Van Dam et al. |
| 2009/0187373 A1 | 7/2009 | Atwell |
| 2009/0205088 A1 | 8/2009 | Crampton et al. |
| 2009/0251680 A1 | 10/2009 | Farsaie |
| 2010/0053715 A1* | 3/2010 | O'Neill ................ G02B 26/105 359/199.3 |
| 2010/0134596 A1* | 6/2010 | Becker ................ G01C 15/002 348/47 |
| 2010/0149407 A1 | 6/2010 | Lee et al. |
| 2010/0195086 A1 | 8/2010 | Ossig et al. |
| 2011/0084868 A1 | 4/2011 | Daly et al. |
| 2011/0011317 A1 | 5/2011 | Ossig et al. |
| 2012/0019806 A1 | 1/2012 | Becker et al. |
| 2012/0033069 A1 | 2/2012 | Becker et al. |
| 2012/0069325 A1 | 3/2012 | Schumann et al. |
| 2012/0069352 A1 | 3/2012 | Ossig et al. |
| 2012/0070077 A1 | 3/2012 | Ossig et al. |
| 2012/0133953 A1 | 5/2012 | Ossig et al. |
| 2012/0287265 A1 | 11/2012 | Schumann et al. |
| 2012/0320193 A1 | 12/2012 | Lienhart et al. |
| 2013/0121529 A1 | 5/2013 | Fleisher et al. |
| 2013/0278759 A1 | 10/2013 | Zimmermann et al. |

FOREIGN PATENT DOCUMENTS

| | | |
|---|---|---|
| CN | 101589316 B | 11/2009 |
| CN | 101907440 A | 12/2010 |
| DE | 2216765 A1 | 4/1972 |
| DE | 19601875 A1 | 7/1997 |
| DE | 19607345 A1 | 8/1997 |
| DE | 19811550 A1 | 9/1999 |
| DE | 19850118 A1 | 5/2000 |
| DE | 19928958 A1 | 11/2000 |
| DE | 20208077 U1 | 5/2002 |
| DE | 10336458 A1 | 2/2004 |
| DE | 20320216 U1 | 4/2004 |
| DE | 10304188 A1 | 8/2004 |
| DE | 10361870 A1 | 7/2005 |
| DE | 102004028090 A1 | 12/2005 |
| DE | 202006005643 U1 | 8/2006 |
| DE | 102005056265 A1 | 5/2007 |
| DE | 102006053611 A1 | 5/2007 |
| DE | 102008014274 A1 | 8/2009 |
| DE | 202013006886 U1 | 11/2013 |
| EP | 0949524 A1 | 10/1999 |
| EP | 1310764 A2 | 5/2003 |
| EP | 1342989 A2 | 9/2003 |
| EP | 1347267 A1 | 9/2003 |
| EP | 1528410 A1 | 5/2005 |
| GB | 2336493 A | 10/1999 |
| JP | H0512414 A | 1/1993 |
| JP | H11153664 A | 6/1999 |
| JP | 2000028720 A | 1/2000 |
| JP | 2001060723 A | 2/2001 |
| JP | 2003156330 A | 5/2003 |
| JP | 2004109106 A | 4/2004 |
| JP | 2006329971 A | 12/2006 |
| JP | 2012032378 A | 2/2012 |
| WO | 0020880 A2 | 4/2000 |
| WO | 0063681 A2 | 10/2000 |
| WO | 2004068211 | 8/2004 |
| WO | 2005008271 A2 | 1/2005 |
| WO | 2005059473 A2 | 6/2005 |
| WO | 200712198 A1 | 2/2007 |
| WO | 2007118478 A1 | 10/2007 |
| WO | 2008068791 A1 | 6/2008 |
| WO | 2008122935 | 10/2008 |
| WO | 2009053085 A1 | 4/2009 |
| WO | 2010108643 | 9/2010 |
| WO | 2011010225 | 1/2011 |
| WO | 2011010226 | 1/2011 |
| WO | 2011021103 A1 | 2/2011 |
| WO | 2011060898 | 5/2011 |

(56) References Cited

FOREIGN PATENT DOCUMENTS

| | | |
|---|---|---|
| WO | 2011060899 | 5/2011 |
| WO | 2011060900 | 5/2011 |
| WO | 2011127375 | 10/2011 |
| WO | 2011141100 | 11/2011 |
| WO | 2011141547 A1 | 11/2011 |
| WO | 2012013277 | 2/2012 |
| WO | 2012013278 | 2/2012 |
| WO | 2012013279 | 2/2012 |
| WO | 2012013280 | 2/2012 |

OTHER PUBLICATIONS

Akca, Devrim, Full Automatic Registration of Laser Scanner Point Clouds, Optical 3D Measurement Techniques, vol. VI, 2003, XP002590305, ETH, Swiss Federal Institute of Technology, Zurich, Institute of Geodesy and Photogrammetry, DOI:10.3929/ethz-a-004656.
Bornaz, L., et al., "Multiple Scan Registration in Lidar Close-Range Applications," The International Archives of the Photogrammetry, Remote Sensing and Spatial Information Sciences, vol. XXXIV, Part 5/W12, Jul. 2003 (Jul. 2003), pp. 72-77, XP002590306.
Brenneke, C., et al., "Using 3D Laser Range Data for Slam in Outdoor Environments", Proceedings of the 2003 IEEE/RSJ International Conference on Intelligent Robots and Systems. (IROS 2003); Las Vegas, NV, Oct. 27-31, 2003; [IEEE/RSJ International Confer.
Chinese Office Action dated Jun. 2, 2010 with English Translation of the Text for Application No. 2006800540959.
Chinese Publication No. CN 1445509, published Oct. 1, 2003—English Abstract Not Available; EP Equivalent 1347267.
Dorit Borrmann, Jan Elseberg, and Andreas Nüchter. Thermal 3D Mapping of Building Façades. In Proceedings of the 8th Conference on Intelligent Autonomous Systems (IAS '12), Jeju Island, Korea, 2012 (10 pages).
DRS Technologies; Tamarisk 320; "A Whole New Dimension in Thermal Imaging Performance"; DRS RSTA, Inc. 2011.
Electro Optics Jun. 2012; Business News "Headwall Photonics Hyperspec Slected by US Navy".
Elstrom, M.D., et al., Stereo-Based Registration of LADAR and Color Imagery, Intelligent Robots and Computer Vision XVII: Algorithms, Techniques, and Active Vision, Boston, MA, USA, vol. 3522, Nov. 2, 1998 (Nov. 2, 1998), Nov. 3, 1998 (Nov. 3, 1998) p. 343-354.
Flir; "12 Things to Consider Before Buying an Infrared Camera; A Guide for Investing in Infrared".
Godin, G., et al., A Method for the Registration of Attributed Range Images, Copyright 2001, [Retrieved on Jan. 18, 2010 at 03:29 from IEEE Xplore]. p. 178-186.
Gom—Optical Measuring Techniques website http://www.gom.com/3d-software/atos-professional.html; extracted Sep. 13, 2012.
http://www.omega.com/techref/iredtempmeasur.html; "Infrared Temperature Measurement Theory and Application"; pp. 1-9.
International Preliminary Report on Patentability and Written Opinion for PCT/EP2013/059649; dated Mar. 17, 2015; 9 pages.
International Search report for the International Searching Authority dated Nov. 28, 2013 for International Application No. PCT US 2013/059649 filed Sep. 13, 2013 (8 pages).
IQsun Laserscanner Brochure, 2 Pages, Apr. 2005.
Jasiobedzki, Piotr, "Laser Eye—A New 3D Sensor for Active Vision", SPIE—Sensor Fusion VI, vol. 2059, Sep. 7, 1993 (Sep. 7, 1993), pp. 316-321, XP00262856, Boston, U.S.A., Retrieved from the Internet: URL:http://scitation.aip.org/getpdf/servlet/Ge.
L. Mihailescu, et al "Standoff 3D Gamma-Ray Imaging" Apr. 2009; vol. 56, No. 2 IEEE Transactions on Nuclear Science (pp. 479-486).
Masaru Sato and Koji Mizuno (2010). Millimeter-Wave Imaging Sensor, Microwave and Millimeter Wave Technologies from Photonic Bandgap Devices to Antenna and Applications, Igor Minin (Ed.), ISBN: 978-953-7619-66-4, InTech, Available from: http://www.intec.
Melexis; MLX90620; Datasheet IR 16×4; Mar. 20, 2012; 3001090620; Rev 2.0.
Non-Final Office Action for U.S. Appl. No. 14/026,243 dated Feb. 5, 2015; 44 pages.
PolyWorks v12 IM Align Reference Guide: 3D Image Alignment Software Version 12.0 for Windows; 10.5 Smoothing 3D Images; reference p. 169 (277 pages). InnovMetric Software Inc.
Steinbichler T-Scan 3—3D Digitizing; 7 Pages; Steinbichler Optotechnik GmbH; www.steinbichler.com.
Top Con "Is Imaging Station; Imaging Robotic Total Station" (4 pages) Topcon Europe Positioning B.V. (Jun. 2008).
Umeda, K., et al., Registration of Range and Color Images Using Gradient Constraints and Ran Intensity Images, Proceedings of the 17th International Conference onPatern Recognition (ICPR'04), Copyright 2010 IEEE [Retrieved online Jan. 28, 2010—IEEE.
Valerie C. Coffey; Multispectral Imaging Moves into the Mainstream; 18/OPN Optics & Photonics News.
Williams, J.A., et al., Evaluation of a Novel Multiple Point Set Registration Algorithm, Copyright 2000, [Retrieved on Jan. 18, 2010 at 04:10 from IEEE Xplore], pp. 1006-1010.
WO 00/26612 is the published equivalent of DE 19850118. Published May 11, 2000.
Written Opinion of the International Searching Authority dated Nov. 28, 2013 for International Application No. PCT US 20131059649 filed Sep. 13, 2013 (8 pages).
Xansys Forum Index; "Mapping temperature data from IR image"; between xu.jing and Martin Liddle.
Japanese Office Action for Application No. 2015-532073 dated May 23, 2017; 3 pgs.
Japanese Office Action for Application No. 2015-532073 dated Jan. 30, 2018; 3 pgs.

* cited by examiner

LASER SCANNER

CROSS-REFERENCE TO RELATED APPLICATIONS

The present application is a continuation application of U.S. patent application Ser. No. 14/026,243 filed on Sep. 13, 2013, which is a nonprovisional application of U.S. Provisional Application No. 61/701,021 filed on Sep. 14, 2012, the contents of which are incorporated herein in their entirety.

BACKGROUND OF THE INVENTION

The subject matter disclosed herein relates to a laser scanner and in particular to a laser scanner able to vary the density of the measured surface points based on characteristics of the surface geometry.

Laser scanners are a type of device that utilize a coherent light source to measure and determine the three-dimensional coordinates of points on an object. Laser scanners are typically used for scanning closed or open spaces such as interior areas of buildings, industrial installations and tunnels. Laser scanners are used for many purposes, including industrial applications and accident reconstruction applications. A laser scanner can be used to optically scan and measure objects in a volume around the scanner through the acquisition of surface points representing objects within the volume. Such surface points are obtained by transmitting a beam of light onto the objects and collecting the reflected or scattered light to determine the distance, two-angles (i.e. an azimuth and a zenith angle), and optionally a gray-scale value. This raw scan data is collected, stored and sent to a processor or processors to generate a three-dimensional coordinates and an image representing the scanned area or object. In order to generate the image, at least three values are collected for each surface point. These three values may include the distance and two angles, or may be transformed values, such as the x, y, z coordinates.

Some contemporary laser scanners may also include a camera mounted on or integrated into the laser scanner for gathering camera digital images of the environment and for presenting the camera digital images to an operator. By viewing the camera images, the operator can determine the extent of the measured volume and adjust the settings of the laser scanner to measure over a larger or smaller region of space. In addition, the camera digital images may be transmitted to a processor to add color to the scanner image. In order to generate a color scanner image, at least six values (three-positional values such as x, y, z; and color values, such as red, green and blue values or "RGB") are collected for each surface point.

It should be appreciated, that the acquisition of three-dimensional coordinates of surface points by laser scanners may result in a large volume of data involving millions of surface points. Many of these surface points may not be needed in order to adequately represent objects or surfaces within the scanned volume. Some extraneous data may be removed during post processing. However, a large amount of storage space may be taken up in the scanner's local storage device by extraneous data acquired during operation.

In addition, there is a tradeoff between scanning speed and resolution of collected 3D measurement values. It is possible to measure a given region of space in a shorter time with lower resolution or to measure the same region of space in a longer time with higher resolution. The determination of time versus resolution depends on the detail in the object being measured, the relatively rate of change in the surface profile, the amount of noise in the scanner data and the corresponding desired amount of filtering, and the characteristics and size of the object being measured. Today, laser scanners operate by collecting data at a fixed angular speed of the beam sent from the scanner to the object under test. The data is later collected, and if more resolution is needed an additional scan is taken.

Accordingly, while existing laser scanners are suitable for their intended purposes, what is needed is a laser scanner that may dynamically adapt the scanning speed and the density of surface point acquisition based on considerations such as the characteristics of geometric features measured within the scanned volume.

BRIEF DESCRIPTION OF THE INVENTION

According to an aspect of the invention, a method of acquiring three-dimensional (3D) coordinates of a surface is provided. The method includes providing the scanner having a light source, a mirror, a first motor, a second motor, a first angle measuring device, a second angle measuring device, a receiver, a distance meter, a camera and a processor, the scanner being configured to emit a light from the light source and reflect the light onto the surface, the scanner further being configured to determine with the processor a three-dimensional coordinate of a point on the surface based at least in part on the first angle measuring device, the second angle measuring device and a reflection of the light from the surface. At least one image is acquired of the surface with the camera. At least one feature is identified on the surface in the at least one image. At least one first area is identified having a high information content. A first arc segment is determined that includes the at least one first area. The surface is scanned by rotating the scanner with the second motor at a first speed during the first arc segment and at a second speed during a second arc segment, the second speed being greater than the first speed. Three-dimensional coordinates are determined of a plurality of points on the surface from the scanning.

According to another aspect of the invention, a system is provided for acquiring three-dimensional (3D) coordinates of a surface. The system includes a scanner having a light source, a mirror, a first motor, a second motor, a first angle measuring device, a second angle measuring device, a receiver, a distance meter, and a camera, the scanner being configured to emit a light from the light source and reflect the light onto the surface, the scanner further being configured to determine a three-dimensional coordinate of a point on the surface based at least in part on the first angle measuring device, the second angle measuring device and a reflection of the light from the surface. A memory is provided having computer readable instructions. One or more processors are provided for executing the computer readable instructions, the one or more processors being operably coupled to the scanner. The computer readable instructions comprising: acquiring at least one image of the surface with the camera; identifying at least one feature on the surface in the at least one image; identifying at least one first area having a high information content; determining a first arc segment that includes the at least one first area; scanning the surface by rotating the scanner with the second motor at a first speed during the first arc segment and at a second speed during a second arc segment, the second speed being greater than the first speed; and determining three-dimensional coordinates of a plurality of points on the surface from the scanning.

According to another aspect of the invention, a method is provided. The method including providing the scanner having a light source, a mirror, a first motor, a first angle measuring device, a second angle measuring device, a receiver, a distance meter, a camera and a processor, the scanner being configured to emit a light from the light source and reflect the light onto a surface, the scanner further being configured to determine with the processor a three-dimensional coordinate of a point on the surface based at least in part on the first angle measuring device, the second angle measuring device and a reflection of the light from the surface. The scanner is rotated with the first motor. A plurality of images is acquired of the surface with the camera while rotating the scanner. At least one first feature on the surface is identified in the plurality of images. At least one first area is identified having a high information content based at least in part on the at least one first feature. A first arc segment is determined that includes the at least one first area. The surface is scanned by rotating the scanner with the first motor at a first speed during the first arc segment and at a second speed during a second arc segment, the second speed being greater than the first speed. Three-dimensional coordinates of a plurality of points are determined on the surface from the scanning. The three-dimensional coordinates are stored.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
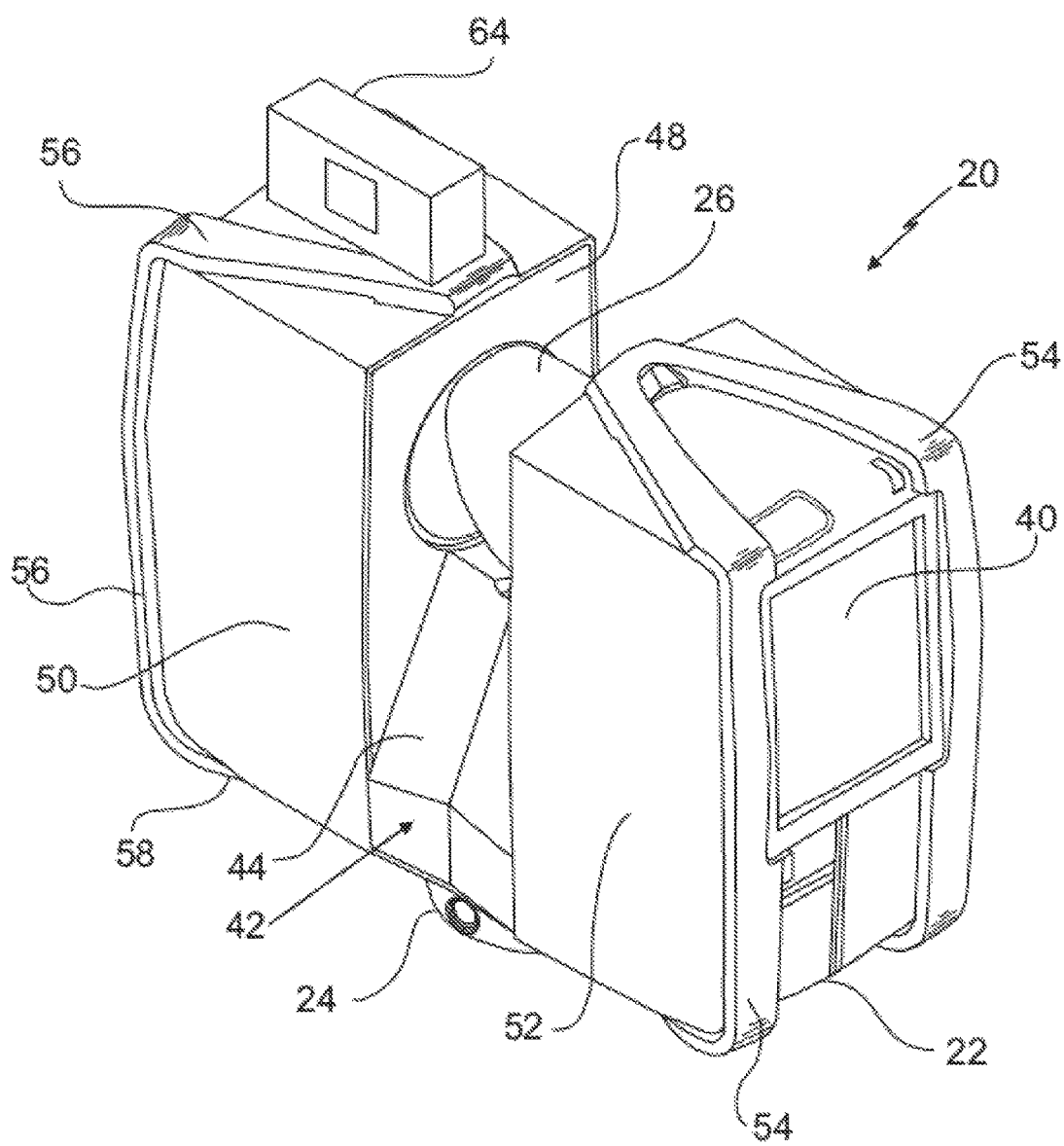
FIG. 1 is a perspective view of a laser scanner in accordance with an embodiment of the invention.
Figure 2:
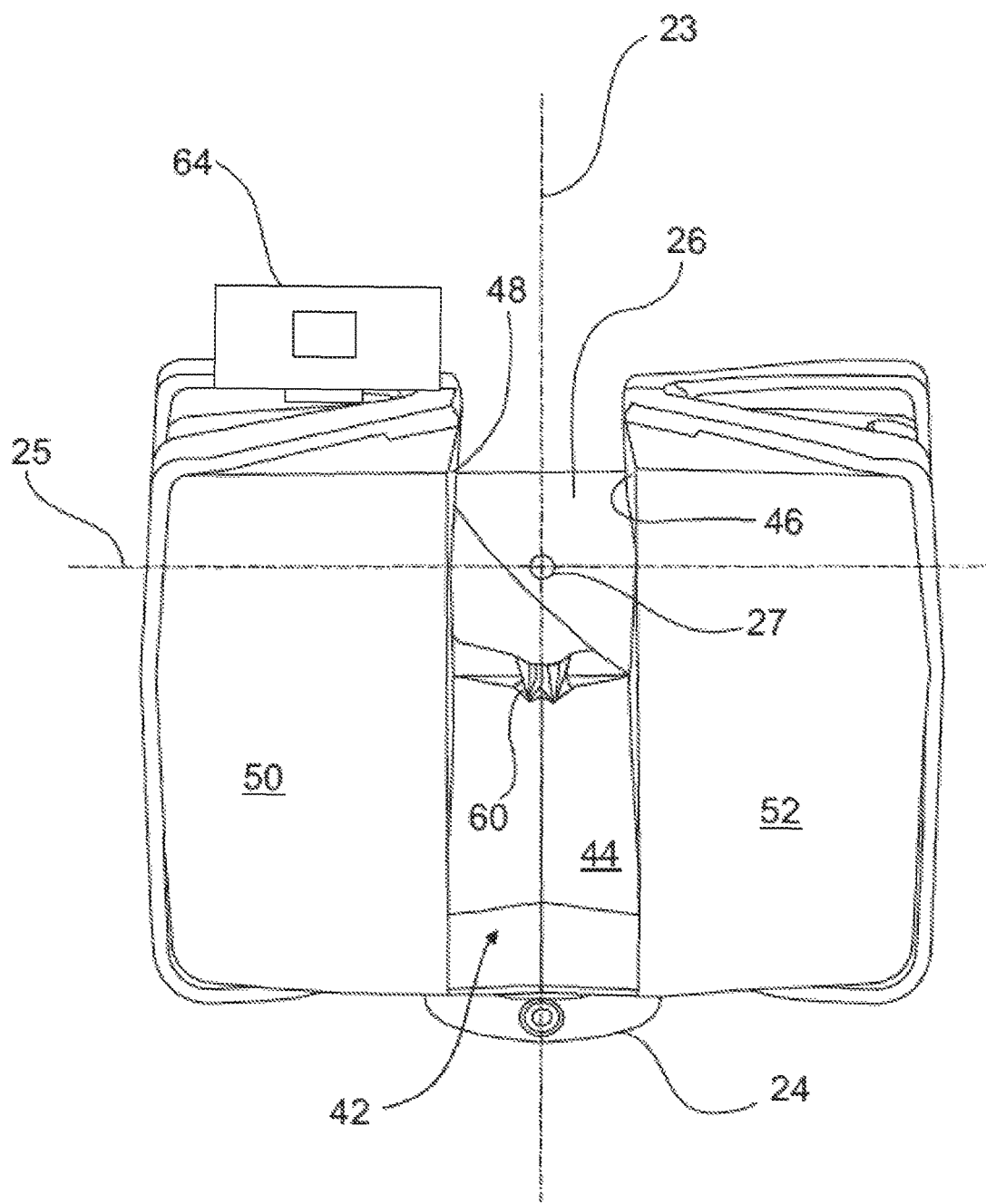
FIG. 2 is a side perspective view of the laser scanner of FIG. 1.
Figure 3:
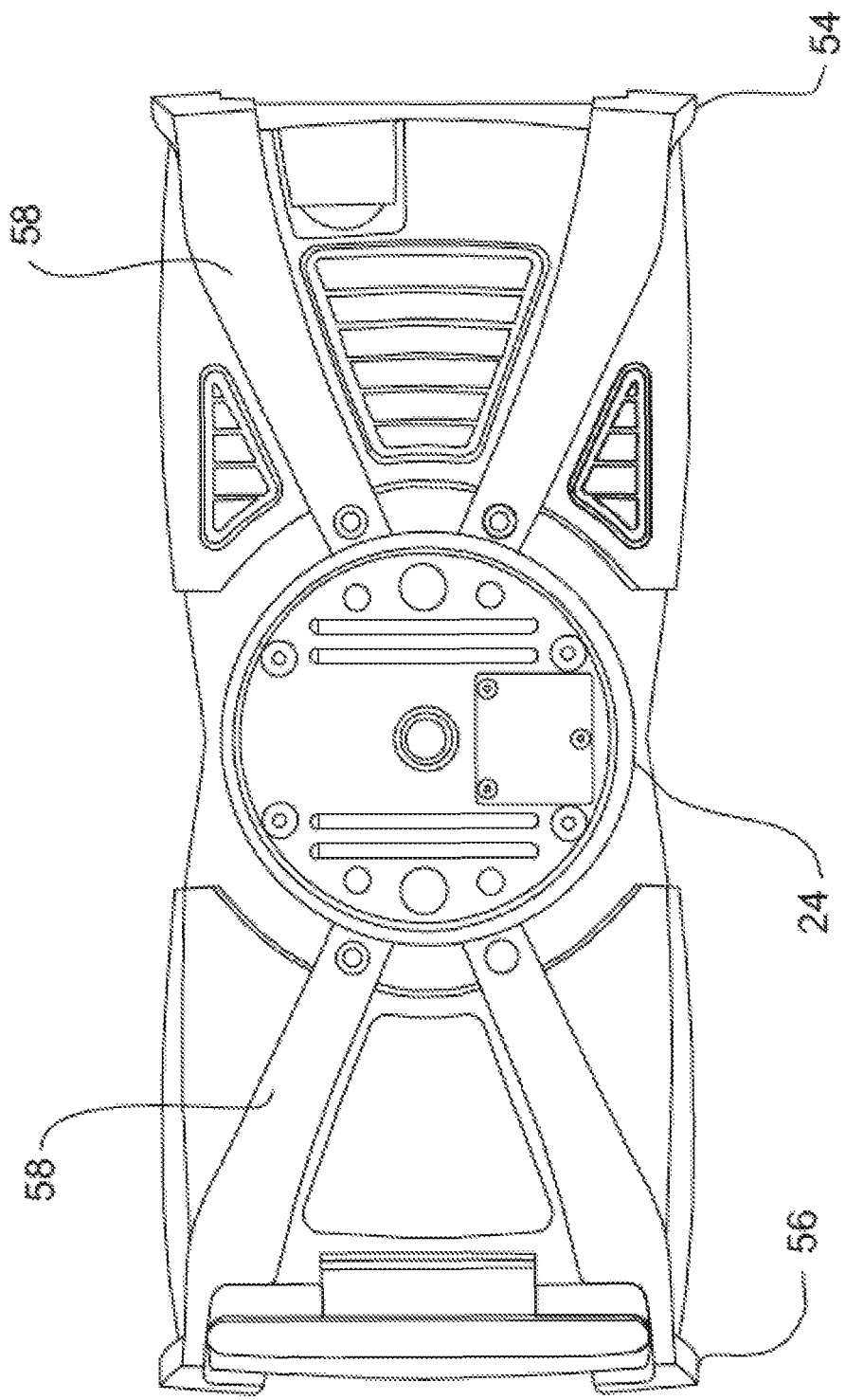
FIG. 3 is a bottom view of the laser scanner of FIG. 1.
Figure 4:
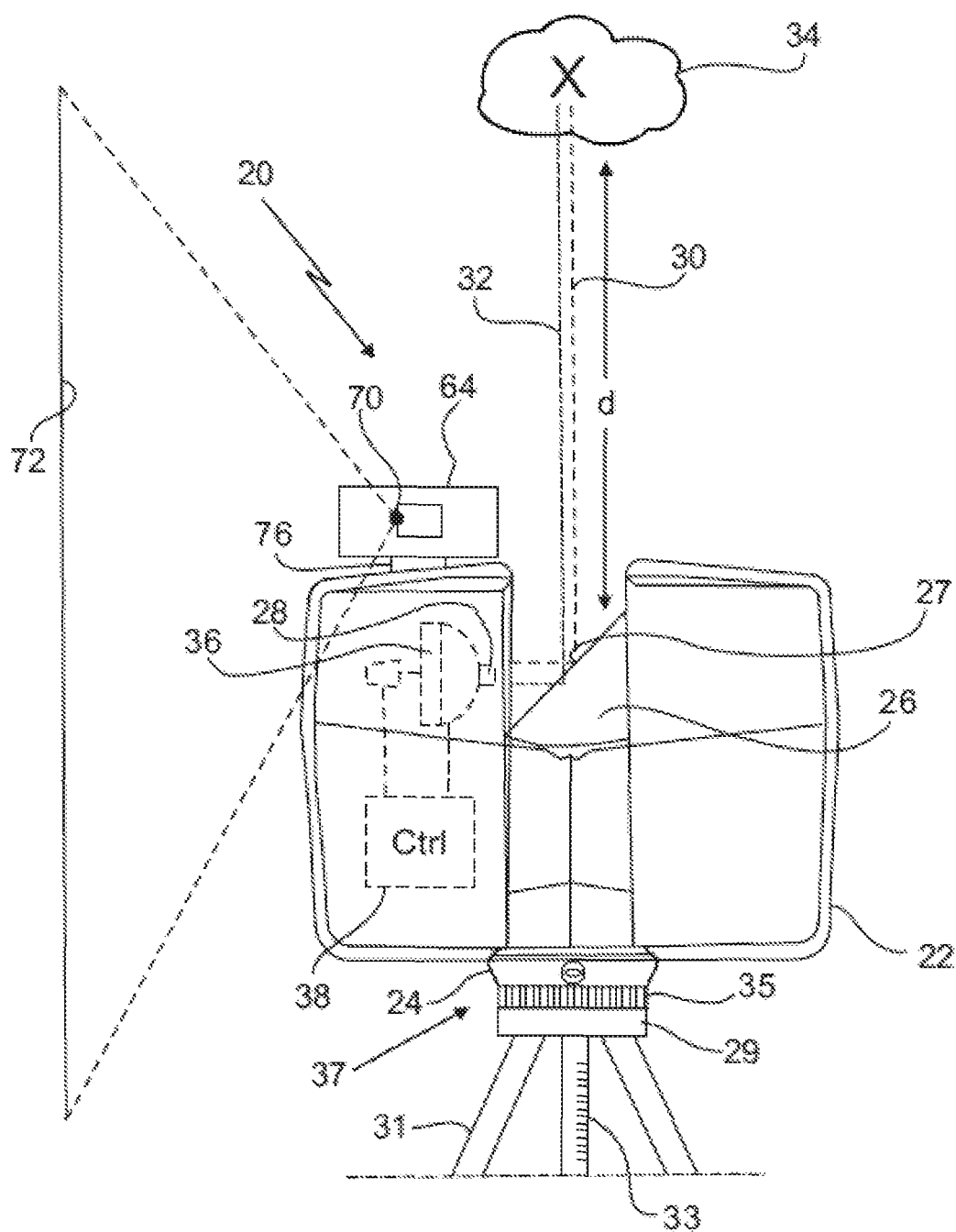
FIG. 4 is a schematic illustration of the laser scanner of FIG. 1 that is optically scanning and measuring a volume.

The detailed description explains embodiments of the invention, together with advantages and features, by way of example with reference to the drawings.

DETAILED DESCRIPTION OF THE INVENTION

Embodiments of the present invention provide for a laser scanner device that may acquire data on the three-dimensional (3D) coordinates of surface points in a scanned volume while having a variable surface point density or a variable scan speed, or both. Embodiments of the present invention provide advantages in reducing the amount of local storage needed while acquiring 3D coordinate data of surface points. Embodiments of the present invention provide advantages in reducing time to complete a measurement, time to graphically display an image of the acquired data, and memory used to store 3D data. In an embodiment, angular speed of a beam of light sent to a surface for 3D measurement is changed dynamically according to evaluation of the collected distances according to a quality factor, wherein the quality factor may depend on a variety of factors discussed herein. In an embodiment, the scanner includes a mirror rotated about a first axis and a second axis, with the scan rates about the first axis and the second axis dynamically adjusted based at least on measured distances according to a quality factor.

In another embodiment, a selected measurement path is provided for the scanner and the angular speed of movement along the path is dynamically adjusted according to a quality factor based at least in part on distance measurements collected during the measurement by the scanner along the path. In another embodiment, a selected measurement path is provided for the scanner and the rate of determining 3D coordinates on a surface is dynamically adjusted according to a quality factor based at least in part on distance measurements collected during the measurement by the scanner along the path. In an embodiment, the determination of a rate of change in the 3D coordinates of the geometry is determined by quickly acquiring data on a first plurality of surface points and then performing a variable-speed higher resolution scan to acquire data on a second plurality of surface points. In another embodiment, the determination of the rate of change in the 3D coordinates of the geometry is determined from at least one image acquired by the scanning device.

Laser scanning devices, such as laser scanner 20, for example, are used to acquire data for the geometry such as surfaces within an environment. These devices use a coherent light source to optically scan the environment and receive reflected beams of light. By knowing the direction and orientation of a beam of light in the amount time it takes to transmit and receive the light beam, the scanning device can determine the 3D coordinates of the surface point where the light reflected from. To obtain a highly detailed scan of an environment, the scanner may have to obtain millions of surface point coordinates, and modern scanner data rates often are one million 3D points per second or greater. It should be appreciated that this results in a very large volume of data, which may be stored either within the scanning device itself, in a locally attached storage device, or on a remote data storage server. In some embodiments, the data may be transmitted over a wired or wireless communications system and stored remotely. In either embodiment, this large volume of data may place limits on the operation of the scanner.

In some systems, this data is compressed or has surface points removed during postprocessing. Typically, the data is transferred to a computer having software configured to receive, manipulate and display the plurality of surface points (sometimes referred to as a "data cloud" or a "point cloud"). While this process assists in reducing the size of the data set, is done after the fact it does not reduce the local storage or communications bandwidth used during the surface point acquisition operation.

In addition, the operating time for measuring a given region of space can vary by more than an order of magnitude according to the selected measurement speed. However, this may be less efficient as, in many cases, there may be regions having detailed features for which high resolution 3D values are desired and other regions where lower resolutions are desired.

Referring now to FIGS. 1-4, a laser scanner 20 is shown for optically scanning and measuring the environment surrounding the laser scanner 20. As will be discussed in more detail herein, the laser scanner 20 is configured to reduce the number of surface points in areas having a low information content profile. As used herein, the term "low information content of file" refers to a geometry that may be described to an acceptable level of detail using a reduced amount of surface points. Examples of geometries that may be described with reduced numbers of surface points are a flat surface and a smooth curved surface. In contrast, some regions may require a relatively high density of surface points. The term "high information content profile" refers to an area having a large rate of change in the geometric features that needs a higher density of surface points to achieve a desired accuracy level. By identifying whether regions to be scanned have high or low information content and then collecting an appropriate density of surface points, data storage requirements may be reduced or minimized. The concept of high information content may be further generalized to include a concept of quality factor and a related concept of quality criterion as further discussed herein below.

The laser scanner 20 has a measuring head 22 and a base 24. The measuring head 22 is mounted on the base 24 such that the laser scanner 20 may be rotated about a vertical axis 23. In one embodiment, the measuring head 22 includes a gimbal point 27 that is a center of rotation about a vertical axis 23 and a horizontal axis 25. In an embodiment, the measuring head 22 has a rotary mirror 26, which may be rotated about a horizontal axis 25. The rotation about the vertical axis may be about the center of the base 24. In an embodiment, the vertical (azimuth) axis 23 and the horizontal (zenith) axis 25 intersect in the gimbal point 27, which may be an origin of a coordinate system.

The measuring head 22 is further provided with an electromagnetic radiation emitter, such as light emitter 28 for example, that emits an emitted light beam 30. In one embodiment, the emitted light beam 30 is coherent light, such as a laser beam for example. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 30 may be amplitude or intensity modulated, for example, with a sinusoidal waveform or with a rectangular waveform. The emitted light beam 30 is emitted by the light emitter 28 onto the rotary mirror 26, where it is deflected to the environment. A reflected light beam 32 is reflected from the environment by an object 34. The reflected or scattered light is intercepted by the rotary mirror 26 and directed into a light receiver 36. The directions of the emitted light beam 30 and the reflected light beam 32 result from the angular positions of the rotary mirror 26 and the measuring head 22 about the axis 25 and axis 23, respectively. These angular positions in turn depend on the rotary drives that cause rotations of the rotary mirror 26 and the measuring head 22 about the axis 25 and axis 23, respectively. Each of the axes 25, 23 include at least one angular transducer for measuring angle. Usually, the angular transducer is an angular encoder.

Coupled to the light emitter 28 and the light receiver 36 is a controller 38. The controller 38 determines, for a multitude of surface points X, a corresponding number of distances d between the laser scanner 20 and surface points X on object 34. The distance to a particular surface point X is determined based at least in part on the speed of light in air through which electromagnetic radiation propagates from the device to the surface point X. In one embodiment the phase shift between the laser scanner 20 and the surface point X is determined and evaluated to obtain a measured distance d. In another embodiment, the elapsed time between laser pulses is measured directly to determine a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight of the light in the air (the round-trip time for the light to travel from the device to the object and back to the device). A method of measuring distance based on the time-of-flight of light (or any type of electromagnetic radiation) depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined using one known side length and two known angles of a triangle. Since the one known length of a triangle side may be the known distance between reference points on a light projector and a camera in a triangulation system, the method of triangulation does not directly depend on the speed of light in air.

In an embodiment, the scanning of the volume about the laser scanner 20 takes place by quickly rotating the rotary mirror 26 about axis 25 while slowly rotating the measuring head 22 about axis 23, thereby moving the assembly in a spiral pattern. For such a scanning system, the gimbal point 27 defines the origin of the local stationary reference system. The base 24 rests in a local stationary frame of reference.

In addition to measuring a distance d from the gimbal point 27 to a surface point X, the scanner 20 may also collect gray-scale information related to the received optical power. The gray-scale value may be determined, for example, by integration of the bandpass-filtered and amplified signal in the light receiver 21 over a measuring period attributed to the surface point X.

Figure 6:
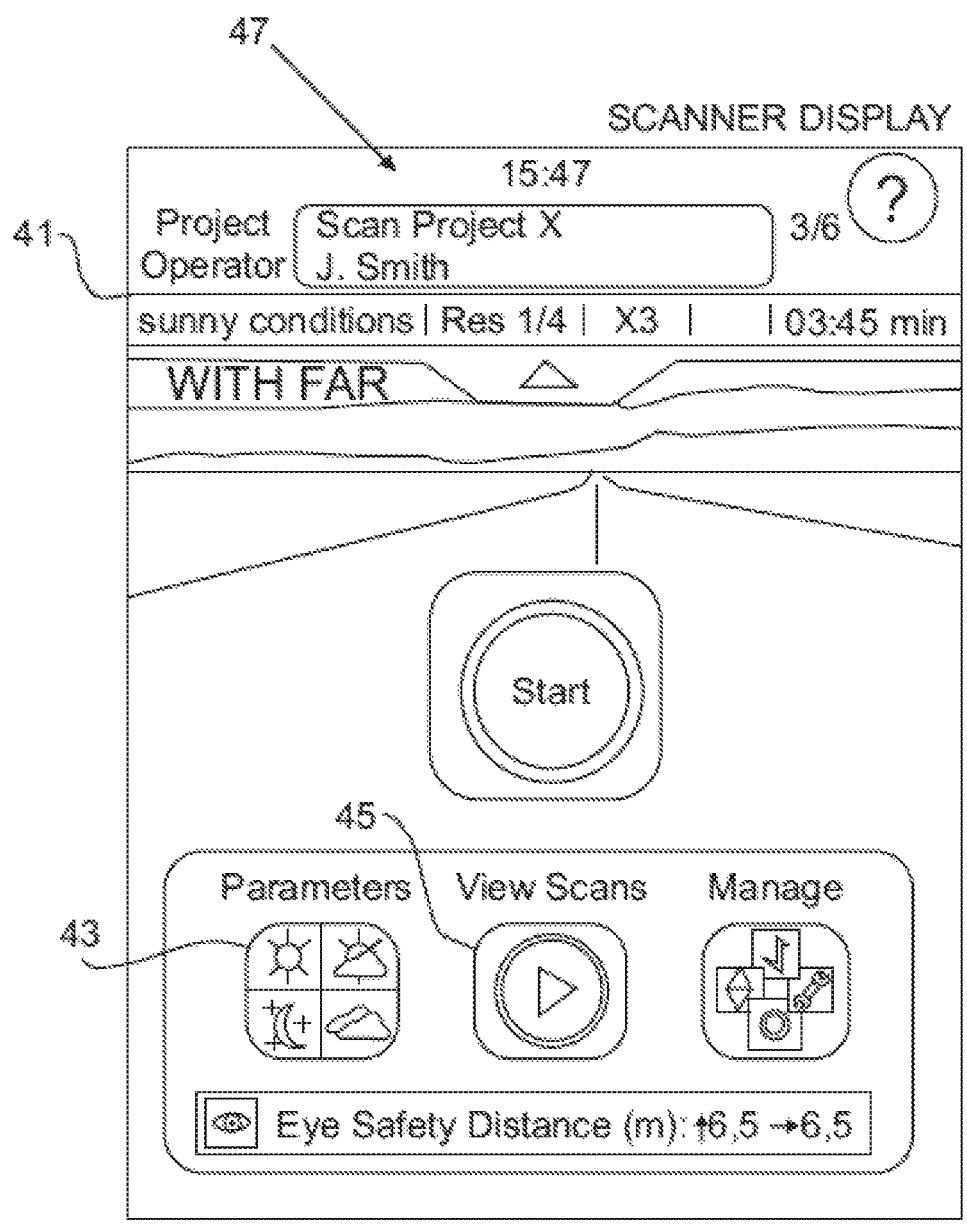
FIG. 6 is an illustration of a user interface screen for the laser scanner of FIG. 1 that includes a touch screen that is utilized by the operator in accordance with an embodiment of the invention.

The measuring head 22 may include a display device 40 integrated into the laser scanner 20. The display device 40 may include a graphical touch screen 41, as shown in FIG. 6, which allows the operator to set the parameters or initiate the operation of the laser scanner 20. For example, the screen 41 may have icons, such as a parameters icon 43 that allows the operator to change the scanning variables. The screen 41 may further have a "view scans" icon 45. The screen 41 may further include a portion 47 that provides the operator with additional information such as the name of the project, the operator logged into the device, ambient temperature and time for example. It should be appreciated that having an integrated display device 40 provides advantages in allowing the operator to perform all of the operations for acquiring data and viewing the scanned image without having to transport and connect additional equipment, such as a laptop computer for example.

The laser scanner 20 includes a carrying structure 42 that provides a frame for the measuring head 22 and a platform for attaching the components of the laser scanner 20. In one embodiment, the carrying structure 42 is made from a metal such as aluminum. The carrying structure 42 includes a traverse member 44 having a pair of walls 46, 48 on opposing ends. The walls 46, 48 are parallel to each other and extend in a direction opposite the base 24. A pair of shells 50, 52 are coupled to the walls 46, 48 and cover the components of the laser scanner 20. In the exemplary embodiment, the shells 50, 52 are made from a plastic material, such as polycarbonate or polyethylene for example. The shells 50, 52 cooperate with the walls 46, 48 to form a housing for the laser scanner 20.

On an end of the shells 50, 52 opposite the walls 46, 48 a pair of yokes 54, 56 are arranged to partially cover the respective shells 50, 52. In the exemplary embodiment, the yokes 54, 56 are made from a suitably durable material, such as aluminum for example, that assists in protecting the shells 50, 52 during transport and operation. The yokes 54, 56 each includes a first arm portion 58 that is coupled, such as with a fastener for example, to the traverse 42 adjacent the base 24. The arm portion for each yoke 54, 56 extend from the traverse 44 obliquely to an outer corner of the respective shell 50, 54. From the outer corner of the shell 50, 54, the yokes 54, 56 extend along the side edge of the shell 32 to an opposite outer corner of the shell 50, 54. Each yoke 54, 56 further include a second arm portion that extends obliquely to the walls 46, 48. It should be appreciated that the yokes 54, 56 may be coupled to the traverse 42, the walls 46, 48 and the shells 50, 54 at multiple locations.

The pair of yokes 54, 56 cooperate to circumscribe a convex space within which the two shells 50, 52 are arranged. In the exemplary embodiment, the yokes 54, 56 cooperate to cover all of the outer edges of the shells 50, 54 and the top and bottom arm portions project over at least a portion of the top and bottom edges of the shells 50, 54. This provides advantages in protecting the shells 50, 54 and the measuring head 22 from damage during transportation and operation. In other embodiments, the yokes 54, 56 may include additional features, such as handles to facilitate the carrying of the laser scanner 20 or attachment points for accessories for example.

On top of the traverse 44, a prism 60 is provided. The prism extends parallel to the walls 46, 48. In the exemplary embodiment, the prism 60 is integrally formed as part of the carrying structure 42. In other embodiments, the prism 60 is a separate component that is coupled to the traverse 44. When the mirror 26 rotates, during each rotation the mirror 26 directs the emitted light beam 30 onto the traverse 44 and the prism 60. Due to non-linearities in the electronic components, in the light receiver 36 for example, the measured distances d depend on brightness. Here brightness is defined as a gray-tone value determined, for example, by integration of the bandpass-filtered and amplified signal of the light receiver 36 over the measuring period which is attributed to the particular point being measured. A nonlinear distance correction for each distance d is stored as a function of brightness. An intensity returned from the prism 50 and measured by the controller 38 during each rotation of the mirror 26 may be used to provide a measure of the emitted intensity to improve accuracy in determining the distance d. It will be understood that other types of corrections, both nonlinear and linear, are possible.

The base 24 is coupled to a swivel assembly 37. The swivel assembly 37 is coupled to the carrying structure 42 and includes a rotary drive or motor 29 that is configured to rotate the measuring head 22 about the axis 23. The motor 29 is seated on a stand 31. The stand 31 is height adjustable and has a scale 33 in order to be able to perform a reproducible height setting. An angular encoder 35 may be coupled to the motor 29 to assist in determining the rotational position of the motor 29. The output signals from encoder 35 are communicated with the controller 30.

The laser scanner 20 may further include vent openings that allow air flow through the laser scanner which prevents temperature from rising to undesirable levels within the laser scanner 20 to protect internal components.

In some applications, it may be desirable to obtain additional information about the scanned volume in addition to the 3D coordinates and gray-scale values of the surface points. In the exemplary embodiment, the laser scanner 20 includes an image acquisition device 64, such as a digital color camera for example. The image acquisition device 64 is in asynchronous and bidirectional communication with the controller 38.

In the exemplary embodiment, the image acquisition device 64 is a color camera having a sensor, such as a CCD or a CMOS sensor 70. The sensor 70 provides a signal which is three-dimensional in color space, such as an RGB signal for example, for a two-dimensional image 68 in real space.

The image acquisition device 64 is mounted to the measuring head 22 by a holder or bracket 76. The brackets 76 fix the device 64 to the measuring head 22 so that the device 64 may be rotated about the axis 23. In this manner, the device 64 may acquire one or more images 72 as the measuring head 22 is rotated about the axis 23 to thus cover the entire angular range. The direction from which the images 72 are taken may be registered by encoders. In one embodiment, the bracket includes a mechanism for relating the attached device.

In other embodiments, other types of camera arrangements may be used to capture 2D color images for integration with the collected 3D surface points. In one embodiment, the camera is an internal camera having an optical axis that is aligned with the optical axis of the 3D scanning system. This alignment allows the turning of the camera to any desired direction about the vertical axis 23 and the horizontal axis 25 using the scanner motors. In addition, because of the alignment of the two optical axes, parallax errors are reduced or minimized.

In another embodiment, the camera is an external camera mounted on an adjustable bracket. After the scanner has completed the acquisition of 3D coordinates for the surface points, the operator may adjust the bracket to align the digital color camera to the vertical axis 23. The operator may then adjust the height of the stand, using the indications of the scale 33, to move the digital camera sensor into the approximate position of the gimbal point 27 prior to the stand adjustment. By making this adjustment, the parallax error is reduced.

Figure 5:
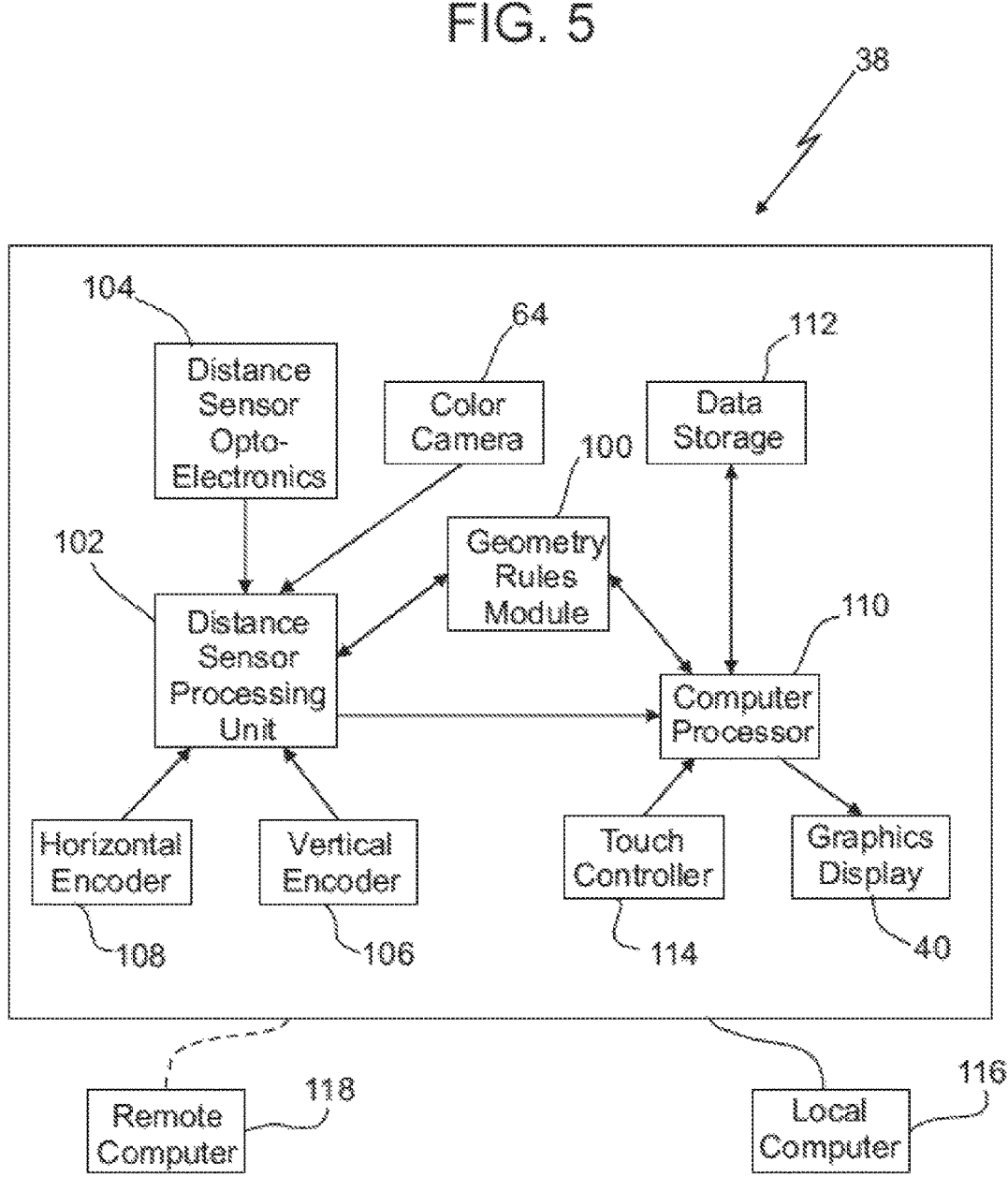
FIG. 5 is a block diagram of the laser scanner control system of FIG. 1.

FIG. 5 illustrates a schematic diagram of controller 38 that includes a geometry rules module 100 that allows the scanner 20 to reduce the amount of 3D coordinate data on the surface points acquired during a scan. The controller 38 includes a geometry processing unit 102 (implemented, for example, by a field programmable gate array or "FPGA") for collecting scan data from a distance sensor opto-electronics module 104, image acquisition device 64, a vertical encoder 106, and a horizontal encoder 108. In an embodiment, the distance sensor opto-electronics module 104 determines a distance to target surface points (e.g., target objects) in the volume being scanned and generates grayscale values that correspond to the amount of light reflected back from the target objects and communicates these values to the geometry processing unit 102. The horizontal encoder 108 communicates the horizontal angle to the geometry processing unit 102. The vertical encoder communicates the vertical angle to the geometry processing unit 102.

In an embodiment, the geometry processing unit 102 sends the collected scan data to a processor 110. The processor 110 may transmit scanned data to a data storage device 112 (e.g., an SD card, or a hard drive). In an embodiment, the computer processor 110 transmits a subset of the calculated values processed by computer processor 110 to a graphical display 42, which displays a representation of the scanned image using the subset of the calculated 3D coordinate values. The processor 110 may receive input from a touch controller 114 (a touchscreen), which may also be the user interface 41.

The images displayed on the graphical display may be in a variety of formats such as a planar format, panoramic format, or 3D format. Each type of format requires a different amount of computer processing and provides different information. In the simplest type of display, herein referred to as a planar display, the data is simply reformatted into a rectangular region. In a planar view, straight lines in the physical world may appear as curves. In a panoramic view, objects in the measurement volume are mapped onto a geometrical shape such as a sphere, cube, or cylinder, thereby removing the distortions seen in the planar view. In a panoramic view, a user can rotate the view but cannot leave the center of the view. In a 3D view, a user can leave the center of the view and observe an undistorted 3D image from any desired location and orientation. A 3D view can even allow a user to "fly" through 3D images of a measured volume, thereby enabling the user to view the measured volume from a variety of views. The planar, panoramic, and 3D views described above may be contrasted to a camera digital image that provides a 2D image. Such 2D images may be useful in providing a color overlay for panoramic and 3D images.

In one embodiment, the controller 38 may be connected to either a local computer 116 (e.g. a computer positioned adjacent to the scanner 20) or remote computer 118 (e.g. a computer connected via a local area network or a wide area network). The external computers 116, 118 may receive and process the scanned data to generate an image, which might be a planar, panoramic, or 3D image, for example. The external computers 116, 118 may be connected to the controller 38 by one or more physical connections, wireless connections, or other means of communication.

It should be appreciated that the calculation 3D point values from the scanned data or the calculation of the subset of the 3D point values may be performed by the geometry processing unit 102, the processor 110, the local computer 116 or the remote computer 118.

In the exemplary embodiment, the geometry processing unit 102 processes collected scan data based on input from a geometry rules module 100. The geometry rules module 100 includes a predetermined set of rules that determine whether the number of measured surface points should be increased or reduced for a given surface or feature type. As used herein, a surface point refers to a three-dimensional coordinates on the surface of an object. It should be appreciated that multiple measurement values may be collected to determine one three dimensional coordinate. These measurement values are then used to determine the final 3D coordinate values.

In a typical laser scanner, the surface points are acquired at a fixed, consistent spacing relative to each other. It should be appreciated that when a surface includes a low information content profile, meaning the surface or feature may be described using a small amount of data, the scanner 20 does not need to acquire the same number of surface points X as would be needed for a more complex geometry. For example, a flat wall may be described by four points, one for each corner. Similarly, a continuous smooth curved surface may require less data to describe the curve. In other words, some geometry types may allow for a lower surface point density. As will be described in more detail below, in one embodiment, a laser scanner 20 makes an initial pass of the volume to be scanned and then applies the geometry rules module 100 to interrogate the initial pass and determine areas that have a low information content profile and areas that have a high information content profile. In this case, the initial pass may be performed by the laser scanner or with an image acquisition device attached to or separate from the laser scanner.

In one embodiment, the initial pass is performed using the laser scanner 20. In this embodiment, the laser scanner 20 performs an initial scan at a high speed. It should be appreciated that a high speed corresponds to a low surface point density. The geometry rules module 100 uses this first plurality of 3D coordinates for the surface points to create representations of surfaces using methods that are well known in the art. The characteristics of the surface representations are used to determine an appropriate surface detail (scan density) for different scan regions. The method for determining the level of surface detail for each of the scan regions generally involves determining a rate of change in the 3D coordinates of surface points in the image over the measured extent. For example, for a region with a high information content profile, the distance to measured points may vary by a large amount in an inconsistent manner within a relatively small scanning area. For example, the distance to a point may increase rapidly over a short distance and then decrease rapidly or remain flat over the next scanning interval. Another way of stating this is that, for a region with a large information content profile, there may be a rapid or large fluctuation in measured distance to the surface points. Note that a large fluctuation in measured distance is not the same as a large change in measured distance, which may be characteristic of regions having a relatively low information content profile. For example, a flat floor has a low information content profile, and yet a scanner may note a large change in distance from point to point. Methods may be selected to properly quantity the notion of fluctuation in distance. Commonly available vision software tools may be used to assist in the evaluation of distance fluctuation. Such tools may include edge detection, blob detection, shape detection and pattern recognition.

Figure 9:
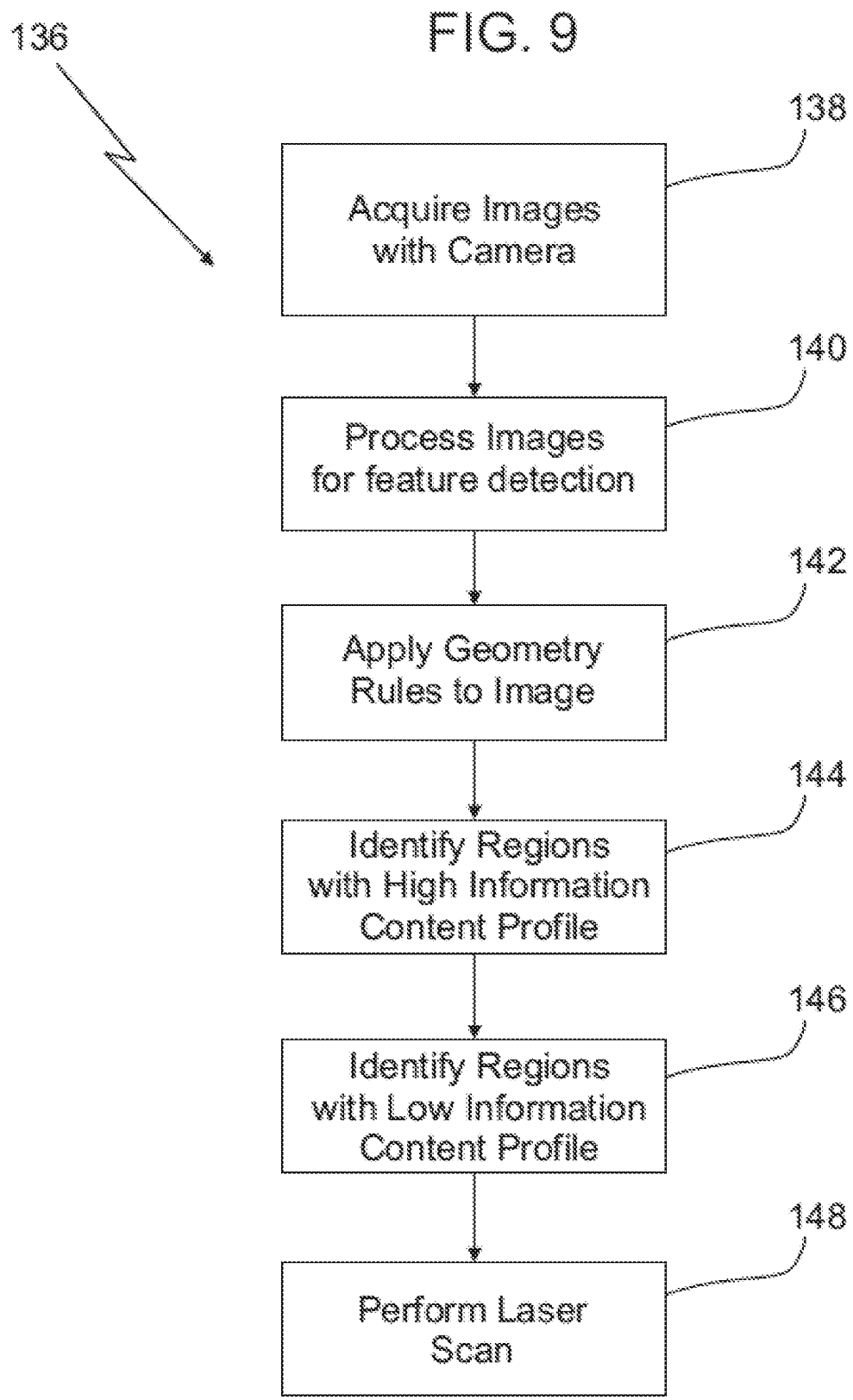
FIG. 9 is a flowchart illustration of another process for measuring the volume with a variable surface point density in accordance with an embodiment of the invention.
Figure 10:
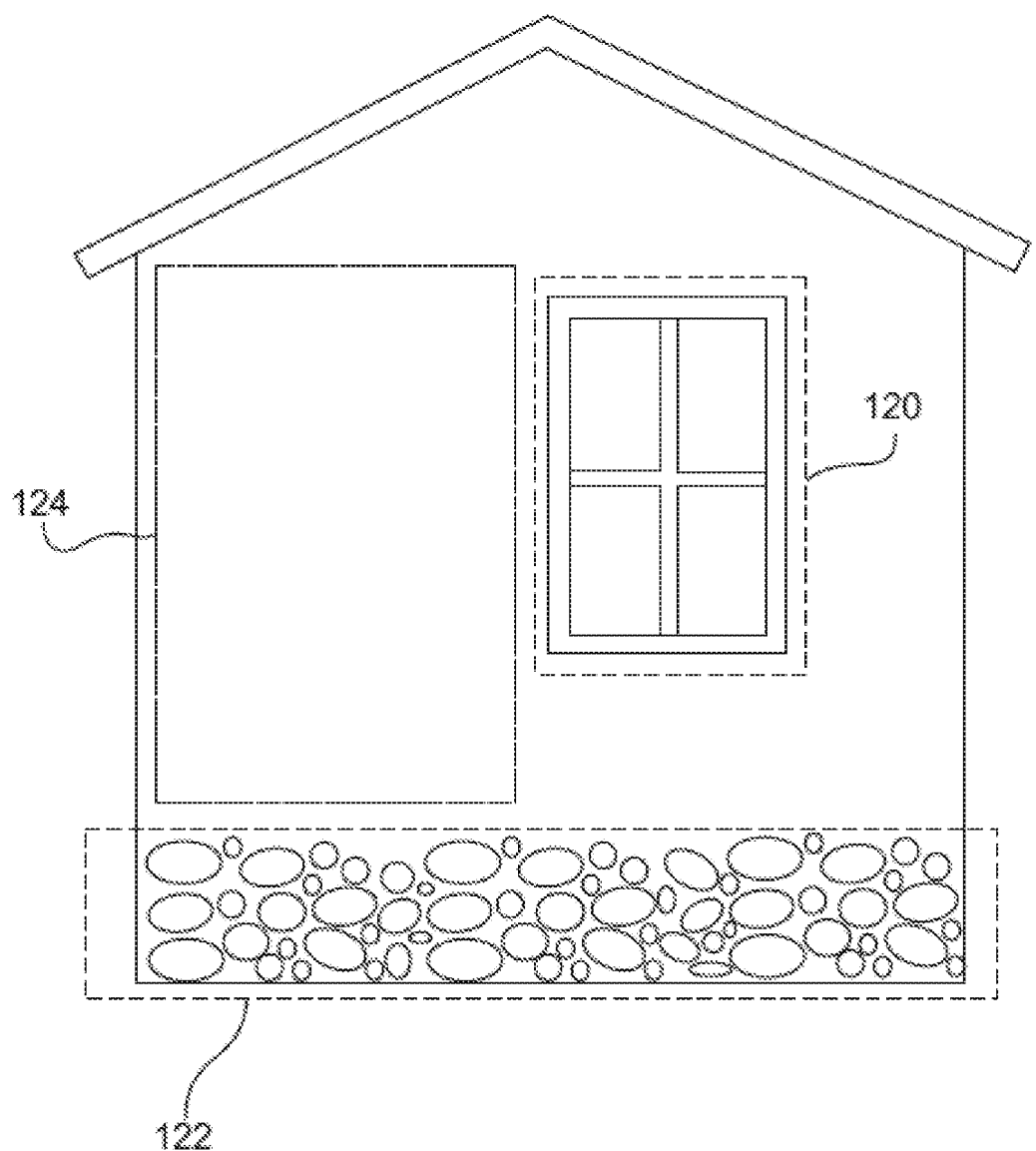
FIG. 10 is an illustration of the scanned volume having areas having a high information content profile and areas having a low information content.

Areas such as edges or places where the geometry changes over short distances, such as the window 120 or stone area 122 in FIG. 9 for example, would be considered areas having a relatively high information content profile. In contrast more uniform areas such as planar surfaces or continuous smooth curves, such as wall section 124 for example, would be classified as having a relatively low information content profile.

Having determined the areas having high and low information content profiles, the geometry rules engine may then determine the angular positions or boundaries of these areas. In the exemplary embodiment, by varying the rotational speed of the motor 29 or mirror 26, the density of the surface points being acquired may be varied. It should be appreciated that the laser scanner may not acquire just the surface points along the edges, but rather will acquire more surface points in regions adjacent the edges and fewer surface points in the center of the region.

In another embodiment, a large quantity of data is collected using a high density scan of the desired area. The results of this high density scan are transferred to the geometry rules engine 100 which applies pre-determined criteria to identify areas of low and high information content. For areas determined to have relatively low information content, some of the data is discarded to generate a subset data set of the scanned data that provides the desired level of resolution while using a reduced the amount of data storage.

In another embodiment, the laser scanner evaluates the data as it is collected and, in response, adjusts the angular speed of the beam of light projected from the scanner or the rate at which 3D points are acquired. In addition, the data used in adjusting the angular speed or 3D acquisition rate may be determined dynamically while the scanner is collecting data.

Furthermore, in an embodiment, the method may include selecting an angular speed or a 3D point acquisition rate based on a quality factor, which may be considered a generalization of the high versus low information content evaluation. For example, it may be known that a region of interest may be contained within a certain range of distances. Therefore, the scanner may move quickly through a region in which the measured distances are not within the desired range, or the scanner may move at a constant angular speed through these regions but collect data more frequently. As another example, a quality factor may include a statistical measure of the returned light. For example, under difficult measurement materials, which might depend on the surfaces being measured or the background environment (for example, bright outdoor light), the noise in the scanner distance data may be larger than would otherwise be the case. In this instance, it may be desirable to measure more slowly to obtain a higher density of measured 3D coordinates so that filtering (such as averaging of nearby points, for example) may be carried out to reduce the noise. The quality factor may also be based at least in part on a measure of the return power, which is related to the grey-scale value as explained above. A low return power is expected to produce higher noise, which may need to be averaged to obtain higher resolution and accuracy, thereby possibly requiring a slower scan. A quality factor may also be related to characteristics of an object that may be known ahead of time such as a temperature of the object or other characteristics such as material reflectance.

The quality factor, which is derived from measured values or known conditions, may be compared to a quality criterion to determine whether angular speed or 3D point acquisition rate should be changed. Examples of quality criteria include a desired maximum error or desired maximum noise. For example, a user may desire an 3D measurement error that does not exceed 3 mm or a root-mean-squared (RMS) noise that is within 1 mm. The quality factor may also indicate a desired level of resolution, for example, a transverse resolution of 0.5 mm or radial resolution of 0.5 mm at a given distance.

Figure 7:
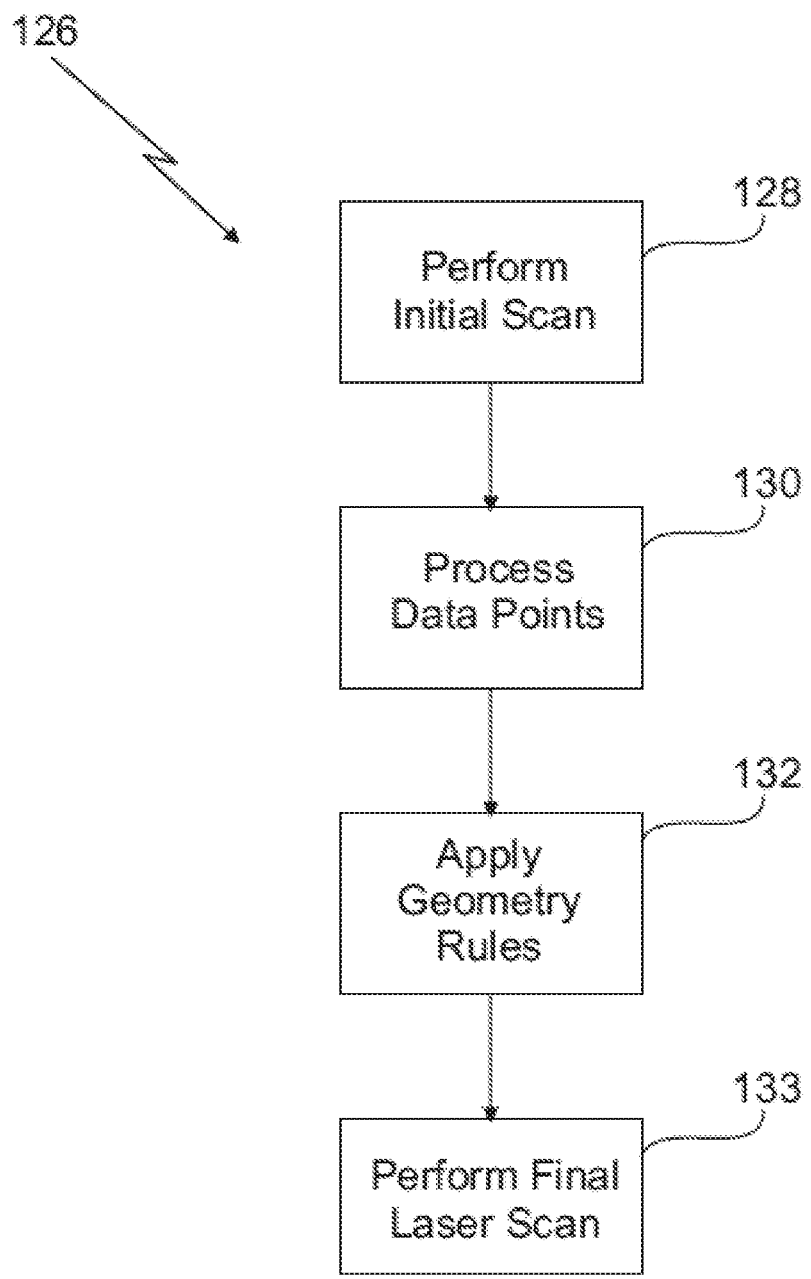
FIG. 7 is a flow chart illustration of a process for measuring a volume with a variable surface point density accordance with an embodiment of the invention.

FIG. 7 illustrates an exemplary process flow 126 that performs the initial scan using the laser scanner. First the process 126 performs an initial scan in block 128 by rapidly rotating the scanner 20 with the motor 29 at a constant speed about the axis 23. By changing the rotational speed of the motor 29, the point density about the azimuthal axis may be increased or decreased. In some embodiments, the rotational speed of the mirror 26 about the zenith axis 25 may be increased or decreased. In other types of scanners, other mechanisms may be used to change the speed of movement of the beam of light striking the region under observation. For example, some scanners may use a mechanically rotating head rather than a mechanically rotating mirror to direct the beam of light. Other types of devices may use a pair of galvanometer mirrors to direct the beam of light to desired locations.

At block 130, surface points obtained from the first scan are processed to determine their 3D coordinates. With the 3D coordinates determined, the geometry rules module is used in block 132 to determine areas having a high and low information content profile. In one embodiment, the determination of these areas includes the determination of the horizontal and vertical angular positions of the boundaries of these areas.

Figure 11:
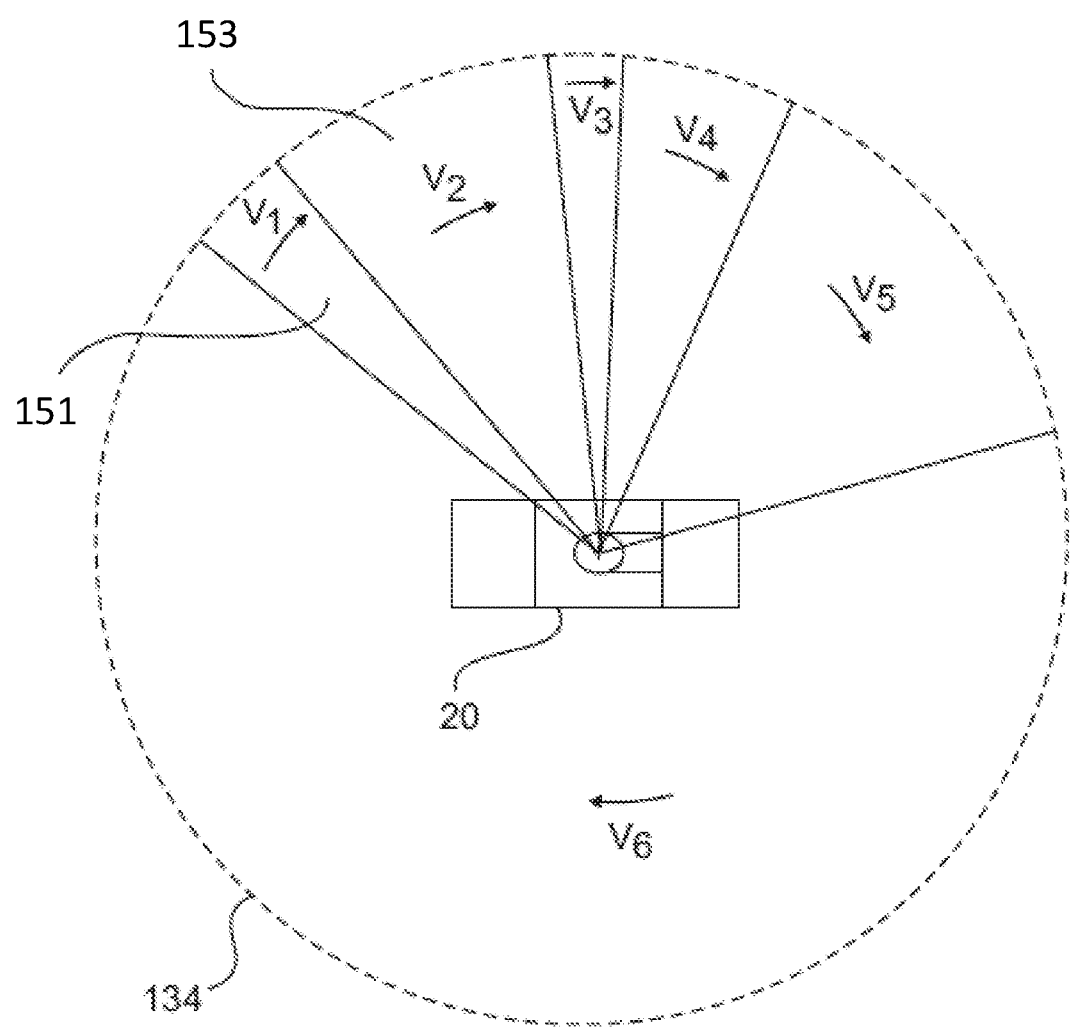
FIG. 11 is a top view schematic illustration of the laser scanner of FIG. 1 having a variable speed about the azimuth axis.

As shown in FIG. 11, as the laser scanner 20 rotates about the 360° circle 134, the circle 134 may be divided into arc segments. (In some cases, the laser scanner may rotate over only 180° since the laser beam may travel around in a complete circle.) The laser scanner may rotate about the vertical axis at a different velocity within each of the arc segments depending on the information content profile of that region. For example, the laser scanner may rotate at a speed $V_1$ in arc segment 151 and at a speed $V_2$ in arc segment 151. In this example, the speed $V_2$ is greater than speed $V_1$. It should be appreciated, that the lower the rotational speed, the higher the scan density will be. It should be further appreciated that the arc 134 may be divided into any number of arc segments, with each arc segment having a different rotational speed.

Figure 12:
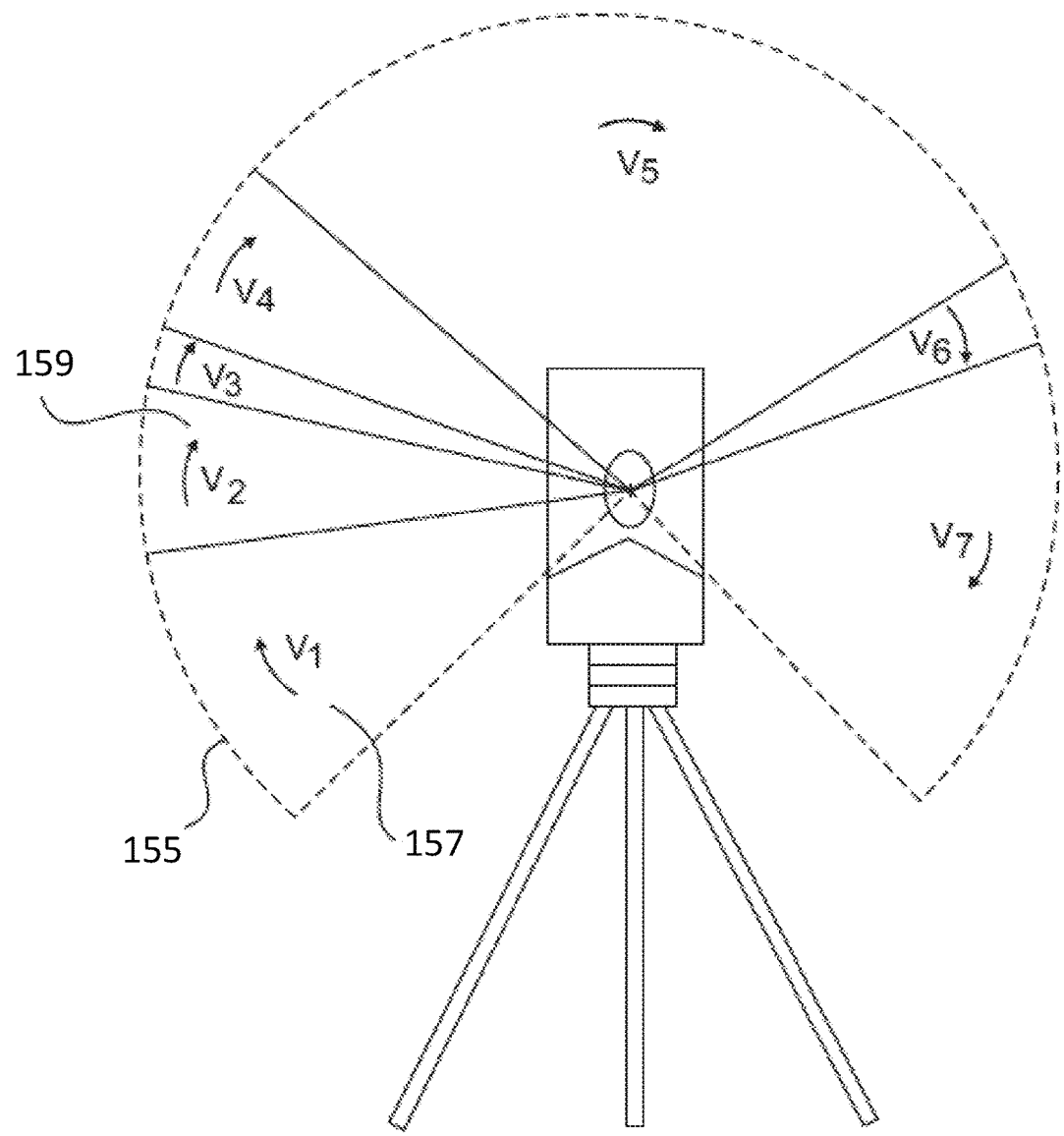
FIG. 12 is a side view schematic illustration of laser scanner of FIG. 1 having a variable mirror speed about the zenith axis.

Similarly, as shown in FIG. 12, the laser beams 30 emitted by the laser scanner 20 are fanned out in an arc 153 as the mirror rotates. In one embodiment, the speed of the mirror 26 may be varied, to segment the arc 153 into a plurality of segments. By varying the rotational speed of the mirror 26, each arc segment may have a different rotational speed and thus surface point density. For example the mirror may rotate at the rotational speed $V_1$ in arc segment 157 and at a rotational speed $V_2$ in arc segment 159. When the rotational speed $V_2$ is less than the rotational speed $V_1$, the surface point density in arc segment 159 will be higher than that in arc segment 157. Depending on the configuration of the laser scanner system, it may or may not be possible to make a relatively rapid change in a rotating mirror such as mirror 26. However, there are many types of laser scanning mechanisms, and the invention taught herein is not limited to the case of a rotating mirror but may include any type of beam steering mechanism (e.g. a galvo-mirror arrangement). Some of these mechanisms permit rapid changes in rotation about a horizontal axis.

In one embodiment the rotational speed within a given arc segment is held substantially constant. In another embodiment, the arcs 134, 153 are not divided into distinct arc segments, but rather the speed of the motor 29 or the mirror 26 is continuously varied over the span of the respective arc.

With the boundaries determined, the controller 38 may vary the speed of motor 29 or mirror 26 to achieve the desired surface point density for the respective area. The process 126 then performs a final optical scan in block 133. The final scan uses a variable motor speed as the scanner head 22 rotates about the axis 23 and the mirror 26 rotates about the axis 25 to increase the surface point density in areas of high information content profile.

Figure 8:
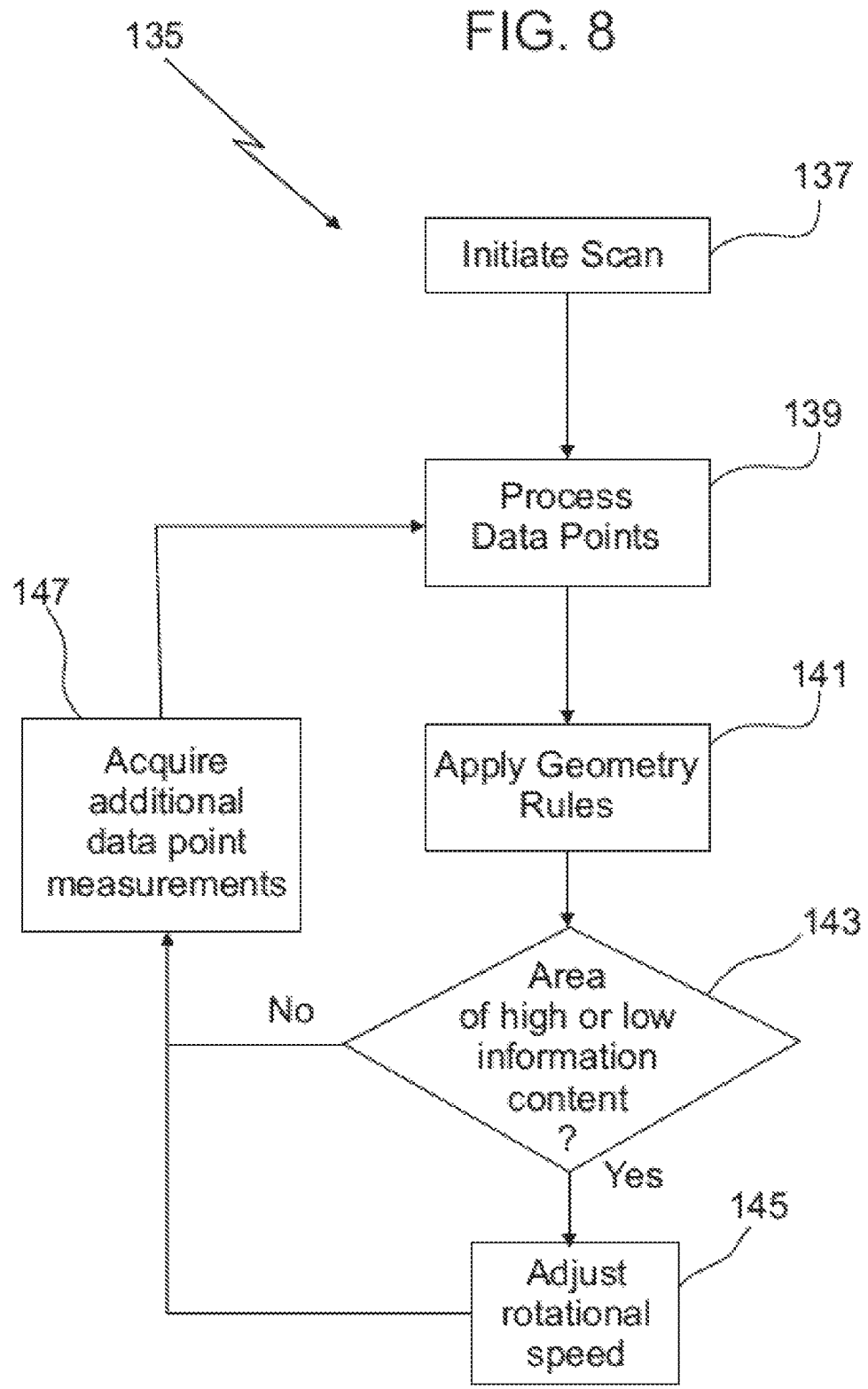
FIG. 8 is a flow chart illustration of a process for measuring a volume with a variable surface point density in accordance with an embodiment of the invention.

In another embodiment, the processing of surface points and the application of the geometry rules is performed during operation and the density of the surface points may be changed to accommodate changes in geometry. It should be appreciated that this provides advantages in allowing the scan data to be acquired in a single rotation of the scanner 20 and eliminates the need for a final scan to acquire additional surface points in areas with higher information content. This process 135 shown in FIG. 8 includes block 137 in which the scan hardware is actuated to perform successive scans. In block 139, scan data is processed to determine 3D coordinates of surface points within the measured volume. The geometry rules are applied in block 141 to determine the level of the information content (for example, whether the information content is high, low, or in-between). At block 145, the rotational speed is determined to properly represent the level of information content in the current scan region. It should be appreciated that the change in rotational speed may be about the azimuth axis, the zenith axis or combination thereof.

In one embodiment, the scanner 20 is configured to rotate in a reverse direction about the azimuth axis momentarily to acquire additional surface points. In another embodiment, the two-dimensional images are captured by the image acquisition device 64 and used to determine the areas having high and low information content profiles. This is different from the embodiment discussed above where the determination of areas having high and low information content profiles is based on measured data. It should be appreciated that while the use of two-dimensional images will typically not provide three dimensional data for determination of areas of high and low information content profiles, the two-dimensional images allow of identification of features such as edges, corners and ridges. Since these areas tend to indicate areas of rapid surface dimensional change, the process 136 can use the information from the two-dimensional images to approximate the areas of high and low information content profiles.

Referring now to FIG. 9, a process 136 is illustrated for performing a variable surface point density scan. The process starts in block 138 where at least one or more images are captured by the image acquisition device 64. This may involve rotating the measuring head 22 in a step wise fashion about the axis 23 with motor 29 for example and capturing images periodically until the areas of interest have been acquired.

Next, the process 136 moves to block 140 where the images are processed. The processing of the images involves methods and algorithms that determine at every surface point in the area of interest whether an image feature of a given type is located at that point or not. Generally, the feature recognition may first involve an image smoothing process, such as Gaussian smoothing for example. The method then attempts to identify feature types, such as edges, corners, blobs and ridges for example. An edge is a boundary between two image regions. Edges may be found by detecting sharp changes or discontinuity in image brightness. Such discontinuities in image brightness have been found to indicate changes in depth, surface orientation, or material properties. One edge detection technique that may be used is the Canny edge detector.

Corner detection involves an analysis for determining rapid changes in direction or high levels of curvature. One corner detection technique that may be used is the Smallest Univalue Segment Assimilating Nucleus (SUSAN) corner detector for example. A blob is a region of interest that has a different property or color when compared to surrounding areas. Blob detectors fall into two main classifications: 1) differential methods based on derivative expressions; and 2) methods based on local extrema in the intensity landscape. One blob detection technique that may be used is the Lapacian of Gaussian (LoG) blog detector.

Ridge detection and valley detection determine whether an interior elongated object in the image represents a local maxima or minima. Ridges occur when there is a sequence of pixels with intensity values that are significantly higher or lower than those adjacent the sequence. The detection process involves computing directional derivatives, such as the direction across the ridge is obtained from the second directional derivative and the peak is determined from the first directional derivative.

Next the process 136 proceeds to block 142 where the geometry rules are applied to the images to determine the areas having high and low information content profiles. The process 136 then determines in block 144 the high information content profile regions, such as the boundaries of arc segments 136 or 142 for example, where the surface point density of the laser scan will be increased. The process 136 then proceeds to block 146 where the low information content profile regions (e.g. arc segment boundaries) are determined and the surface point density of the laser scan will be decreased. With boundaries of the areas of density change defined, the process 136 proceeds to block 148 where the laser scanner 20 performs an optical scan having a variable surface point density of the scanned volume.

Figure 13:
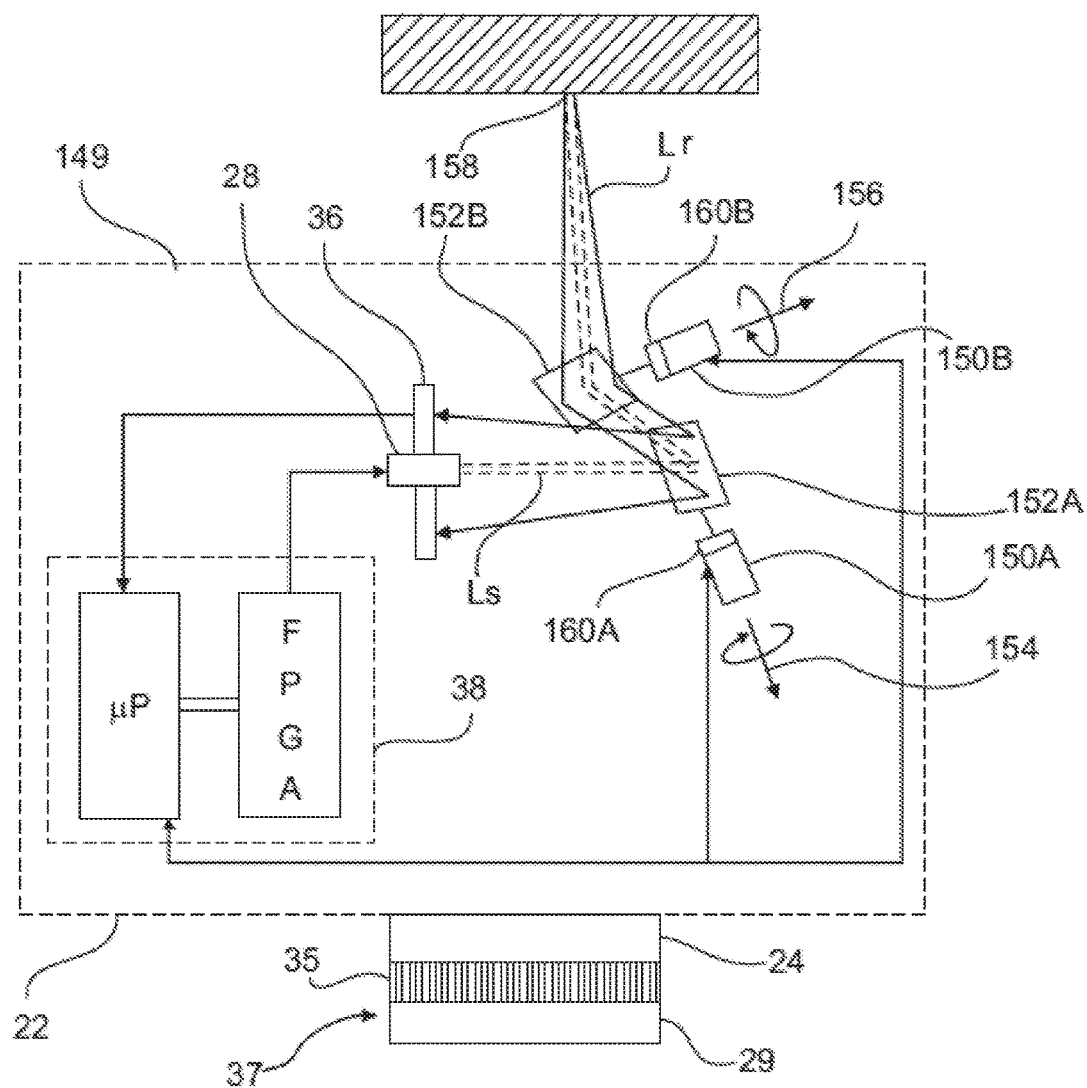
FIG. 13 is a schematic view of a noncontact distance measurement device having a galvo mirror arrangement in accordance with an embodiment of the invention.

It should be appreciated that while the exemplary embodiment describes the laser scanner as having a measuring head having a rotating mirror that is rotated by a motor about an axis 23, this is for exemplary purposes and the claimed invention should not be so limited. Referring now to FIG. 13, another embodiment is shown having a galvo-mirror arrangement arranged in the measuring head 22. A galvanometer, commonly referred to as a galvo 150A, 150B, is a device that moves in response to an electrical current. By arranging a first galvo 150A orthogonally to a second galvo 150B, the galvos 150A, 150B can move mirrors 152A, 152B about two axes 154, 156, respectively. In one embodiment, the axes 154, 156 are mutually orthogonal and the mirrors 152A, 152B are mutually orthogonal. As a result, the measuring beam Ls may be directed to illuminate points over an area 158 on the object rather than in a radial fanned line. In one embodiment, the galvos 150A, 150B are electrically coupled to the controller 38. In an embodiment, in order to correlate the distance and intensity information with the individual measuring points, each galvo includes an angle transducer, such as an angular encoder 160A, 160B, to measure the position of the associated galvo 150. In another embodiment, the angle is determined based on the current applied to each galvo.

In one embodiment, the controller 38 determines the distance to an object point and correlates this with the encoder 160 data to determine the three-dimensional coordinate data (for example, X, Y, Z) from the device 149. In an embodiment, a single galvo 150A is used without galvo 150B so that the beam of light is moved along a single dimension rather than along two dimensions. In this case, the movement of the noncontact measuring device 149 by the operator to obtain three-dimensional coordinates along both dimensions.

In some embodiments, the galvo-mirror arrangement may scan in two-dimensions over a narrow field of view, such as +/−20° for example. In these embodiments, the measuring head 22 may include a swivel assembly 37, a motor 29 and encoder 35. The motor 29 rotates the measuring head about an axis, while the encoder 35 provides a signal to the controller 38. This allows the controller 38 to determine the angular orientation of the measuring head 22 to determine the three-dimensional coordinates. It should be appreciated that the use of a galvo-mirror arrangement may provide further advantages since the measuring laser beam may be directed. Therefore, the controller 38 may be able to vary the surface point density by detecting changes in geometry during the optical scan. In this embodiment, the geometry rules module 100 is operated during the optical scan. When the geometry changes detected, the controller may direct the laser beam back towards the area of the geometry change to increase the surface point density for this area. In this way, the initial scan described above may be omitted, saving time and reducing data storage requirements further.

Figure 14:
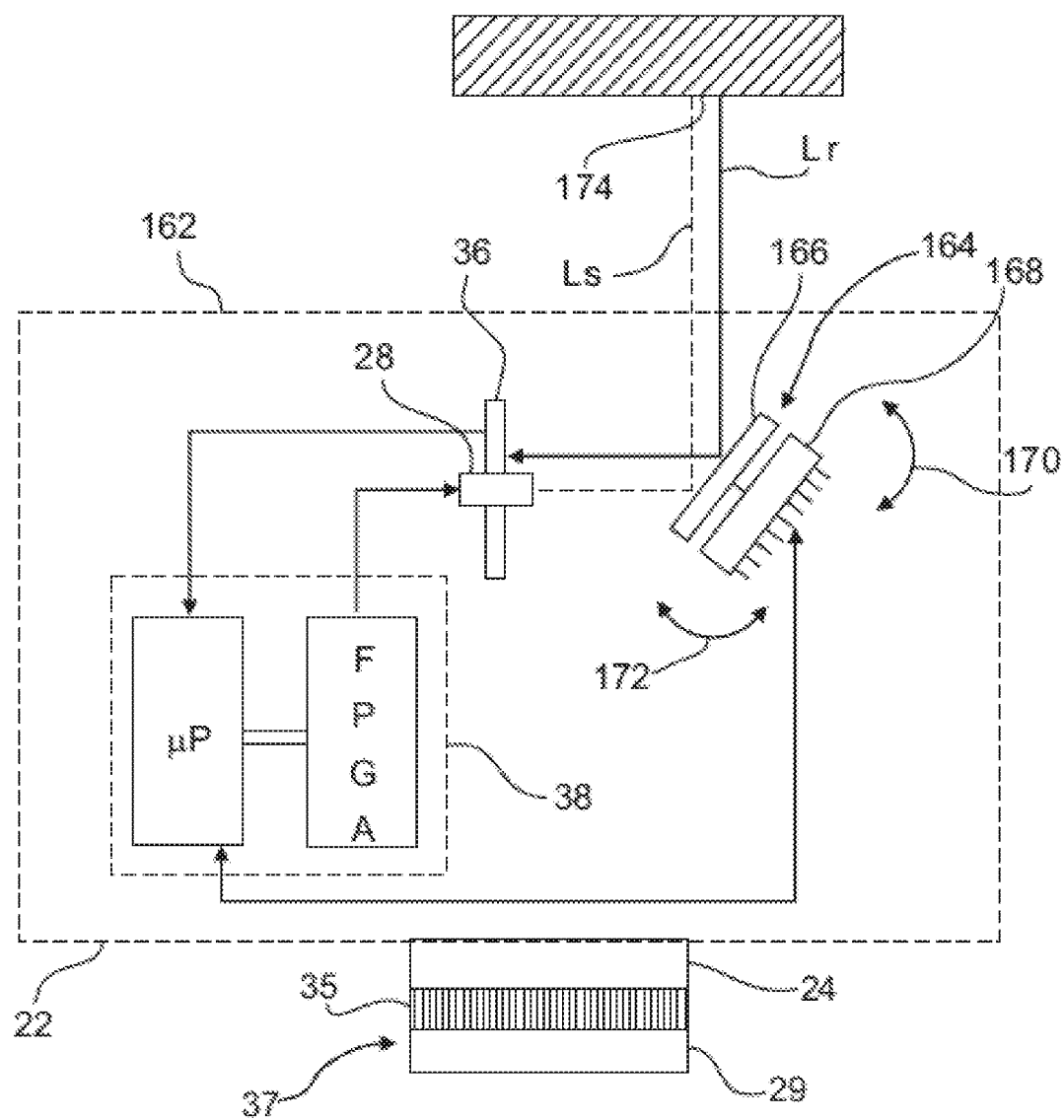
FIG. 14 is a schematic view of a noncontact distance measurement device having a micro-electromechanical system (MEMS) mirror in accordance with an embodiment of the invention.

Another embodiment of a non-contact measuring device 162 is shown in FIG. 14. In this embodiment, the mirror is a micro electro-mechanical system (MEMS) device 164. In an embodiment, the MEMS device 164 includes a mirror 166 mounted to a semiconductor device 168. In one embodiment the MEMS device 164 is a Mirrorcle Technologies, Inc. dual-axis scanning mirror mounted on a 24 pin chip. A MEMS device 164 uses a large voltage potential across capacitive plates to move the mirror 166 about two orthogonal axes 170, 172. In the exemplary embodiment, the MEMS device 164 can rotate the mirror 166 at scanning angles of −10° to +10° for each axis. Similar to the galvo mirror system discussed above, the MEMS device 164 allows the illuminations of surface points over an area 174 rather than a line.

In the exemplary embodiment, the orientation of the mirror 166 is directly proportional to the voltage applied. In one embodiment, a swivel assembly 37, encoder 35, and motor 29 are coupled to the measuring head 22 to allow the device 162 to be rotated about an axis. This provides advantages in that the encoder may be eliminated since the controller 38 may correlate the distance and intensity data to the angle of the mirror 166 based on the applied voltage and the position of the motor 29 to determine the coordinate data (X, Y, Z) of the measured object points. In another embodiment, the MEMS device 164 includes an array of small mirror elements that can be rotated to a desired direction.

It should be appreciated, that the use of the MEMS device 164 may provide further advantages in allowing the density of surface points to be varied during the optical scan since the light beam may be directed over an area. When a change in geometry is detected, the controller 38 may direct the laser beam back over the area of geometry change to increase the surface point density in this area.

A scanner of the type shown in FIGS. 1-4 has independent rotary drives for the axes 23, 25 which may adjust the speed in either of both angular directions. If the angular speeds of both axes are changed proportionally, the general path of the spiral pattern will remain the same, but the number of raw data points collected along the path will differ for the slow and fast case. Depending on the number of raw data points used to determine each 3D coordinate, the number of 3D coordinates may change or may stay the same as before the change in speed. It is also possible to change the speeds of the axes 23, 25 by different proportions, resulting in a different path for the beam of light.

In the case of a scanner using a different beam steering method, for example, as shown in FIGS. 13, 14, similar principles apply as the angular movements in the two orthogonal axes may be changed by proportional or non-proportional amounts.

The technical effects and benefits include the ability to provide a three-dimensional optical scan of a volume with variable surface point density. This can lead to a faster scan having higher resolution in areas of interest. Further technical effects and benefits include the reduction in the amount of computer storage used for the scan data.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "unit," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the laser scanner, partly on the laser scanner, as a stand-alone software package, partly on the laser scanner and partly a connected computer, partly on the laser scanner and partly on a remote computer or entirely on the remote computer or server. In the latter scenario, the remote computer may be connected to the laser scanner through any type of network, including a local area network (LAN) or a wide area network (WAN), or the connection may be made to an external laser scanner (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of acquiring three-dimensional (3D) coordinates of a surface, the method comprising:
    providing a scanner having a light source, a mirror, a first motor for rotating the scanner, a second motor for rotating the mirror, a receiver, a distance meter, a camera and a processor, the scanner being configured to emit a light from the light source and reflect the light onto the surface, the scanner further being configured to determine with the processor a three-dimensional coordinate of a point on the surface based at least in part on a rotational position of the scanner about a vertical axis, a rotational position of the mirror about a horizontal axis and a reflection of the light from the surface;
    acquiring at least one image of the surface with the camera;
    identifying at least one feature on the surface in the at least one image;
    identifying at least one first area having a high information content, the first area being associated with the at least one feature;
    determining a quality factor for the first area;
    determining a first speed for the first motor from a comparison of the quality factor to a quality criterion;
    scanning the surface by rotating the scanner with the first motor at a first speed during a first arc segment of rotation of the scanner that includes the at least one first area and at a second speed during a second arc segment of rotation that does not include the at least one first area; and
    determining three-dimensional coordinates of a plurality of points on the surface from the scanning.

2. The method of claim 1 wherein the identifying the at least one feature includes image smoothing.

3. The method of claim 1 wherein the at least one feature includes at least one of an edge, corner, blob or ridge.

4. The method of claim 1 further comprising identifying at least one second area having low information content.

5. The method of claim 4 further comprising identifying a third arc segment containing the at least one second area.

6. The method of claim 5 wherein the scanning further includes rotating the second motor at a third speed during the third arc segment, the third speed being greater than the second speed.

7. The method of claim 1 further comprising generating a variable surface point density point cloud of the surface.

8. A system for acquiring three-dimensional (3D) coordinates of a surface, the system comprising:
a scanner having a light source, a mirror, a first motor configured to rotate the scanner, a second motor configured to rotate the mirror, a receiver, a distance meter, and a camera, the scanner being configured to emit a light from the light source and reflect the light onto the surface, the scanner further being configured to determine a three-dimensional coordinate of a point on the surface based at least in part on a rotational position of the scanner about a vertical axis, a rotational position of the mirror about a horizontal axis and a reflection of the light from the surface;
a memory having computer readable instructions; and
one or more processors for executing the computer readable instructions, the one or more processors being operably coupled to the scanner, the computer readable instructions comprising:
acquiring at least one image of the surface with the camera;
identifying at least one feature on the surface in the at least one image;
identifying at least one first area having a high information content, the first area being associated with the at least one feature;
determining a quality factor for the first area;
determining a first speed for the first motor from a comparison of the quality factor to a quality criterion;
scanning the surface by rotating the scanner with the first motor at a first speed during a first arc segment of rotation of the scanner that includes the at least one first area and at a second speed during a second arc segment of rotation that does not include the at least one first area; and
determining three-dimensional coordinates of a plurality of points on the surface from the scanning.

9. The system of claim 8 wherein the identifying the at least one feature includes image smoothing.

10. The system of claim 8 wherein the at least one feature includes at least one of an edge, corner, blob or ridge.

11. The system of claim 8 wherein the computer readable instructions further comprise identifying at least one second area having low information content.

12. The system of claim 11 wherein the computer readable instructions further comprise identifying a third arc segment containing the at least one second area.

13. The system of claim 12 wherein during the scanning includes rotating the second motor at a third speed during the third arc segment, the third speed being greater than the second speed.

14. The system of claim 8 wherein the computer readable instructions further comprise generating a variable surface point density point cloud of the surface.

15. A method comprising:
providing a scanner having a light source, a mirror rotatable about a horizontal axis, a first motor for rotating the scanner about a vertical axis, a receiver, a distance meter, a camera and a processor, the scanner being configured to emit a light from the light source and reflect the light onto a surface, the scanner further being configured to determine with the processor a three-dimensional coordinate of a point on the surface based at least in part on a rotational position of the scanner about the vertical axis, a rotational position of the mirror about the horizontal axis and a reflection of the light from the surface;
rotating the scanner with the first motor;
acquiring a plurality of images of the surface with the camera while rotating the scanner;
identifying at least one first feature on the surface in the plurality of images;
identifying at least one first area having a high information content, the first area being associated with the at least one first feature;
determining a quality factor for the first area;
determining a first speed for the first motor from a comparison of the quality factor to a quality criterion;
scanning the surface by rotating the scanner with the first motor at a first speed during a first arc segment of rotation of the scanner that includes the at least one first area and at a second speed during a second arc segment of rotation that does not include the at least one first area;
determining three-dimensional coordinates of a plurality of points on the surface from the scanning; and
storing the three-dimensional coordinates to a memory storage device.

16. The method of claim 15 further comprising identifying a third arc segment containing the at least one second area, the at least one second area including at least one second feature.

17. The method of claim 16 wherein the scanning further includes rotating the first motor at a third speed during the third arc segment, the third speed being greater than the second speed.

18. The method of claim 17 wherein a density of the plurality of points in the at least one second area is lower than that at least one first area.

19. The method of claim 15 wherein the scanner further includes a second motor coupled to rotate the mirror.

20. The method of claim 15 wherein the scanner further includes a galvo operably coupled to the mirror.

* * * * *